United States Patent
Mantegazza et al.

(10) Patent No.: US 10,416,010 B2
(45) Date of Patent: Sep. 17, 2019

(54) METHOD FOR IDENTIFYING OBSTRUCTIONS IN PIPELINE NETWORKS FOR TRANSPORTING FLUIDS

(71) Applicant: ENI S.P.A., Rome (IT)

(72) Inventors: Tommaso Mantegazza, Cernusco sul Naviglio (IT); Alberto Giulio Di Lullo, Tribiano (IT); Paolo Bocchini, Cesena (IT); Alessandro Marzani, Bologna (IT)

(73) Assignee: ENI S.p.A., Rome (IT)

( * ) Notice: Subject to any disclaimer, the term of this patent is extended or adjusted under 35 U.S.C. 154(b) by 571 days.

(21) Appl. No.: 14/398,192

(22) PCT Filed: May 14, 2013

(86) PCT No.: PCT/IB2013/053910
§ 371 (c)(1),
(2) Date: Oct. 31, 2014

(87) PCT Pub. No.: WO2013/171666
PCT Pub. Date: Nov. 21, 2013

(65) Prior Publication Data
US 2015/0134276 A1    May 14, 2015

(30) Foreign Application Priority Data

May 15, 2012   (IT) .............................. MI2012A0838

(51) Int. Cl.
*G01F 1/00* (2006.01)
*G01F 1/34* (2006.01)
(Continued)

(52) U.S. Cl.
CPC ............ *G01F 1/34* (2013.01); *G01F 25/0007* (2013.01); *B08B 9/0325* (2013.01)

(58) Field of Classification Search
CPC ....... G01N 22/02; G01F 1/34; G01F 25/0007; B08B 9/0325
(Continued)

(56) References Cited

U.S. PATENT DOCUMENTS

| | | | |
|---|---|---|---|
| 6,751,560 B1 * | 6/2004 | Tingley | G01N 22/02 702/51 |
| 2004/0093172 A1 * | 5/2004 | Mizushina | G01M 3/2807 702/50 |

(Continued)

OTHER PUBLICATIONS

International Search Report and Written Opinion of the International Searching Authority dated Aug. 6, 2013, in PCT/IB2013/053910, filed May 14, 2013.
(Continued)

*Primary Examiner* — Toan M Le
*Assistant Examiner* — Xiuqin Sun
(74) *Attorney, Agent, or Firm* — Oblon, McClelland, Maier & Neustadt, L.L.P.

(57) ABSTRACT

It is described a method for detecting and identifying obstructions in a pipeline network for transporting fluids, wherein the network is composed of a plurality of pipeline sections (P) and a plurality of junctions (N). The method comprising the following phases: acquiring the geometrical data of a predefined number of pipeline sections (P) for which the presence of obstructions has to be evaluated; measuring the actual flow-rate values ($Q_1$) of the fluid in one or more pipeline sections (P) and of the actual pressure values ($h_1$) of the fluid at one or more junctions (N) of the network; comparison between the values of the nominal diameters ($D_1$) of said pipeline sections (P) and the corresponding equivalent diameters ($D_i^{eq}$) of said pipeline sections (P); calculating, by means of a specific numerical model, the theoretic flow-rate values ($Q_i^T$) and pressure values ($h_i^T$) of the fluid for said equivalent diameters ($D_i^{eq}$).

(Continued)

With $=(D_i^{eq})\alpha \times D_i$ method provides a calculation phase of the value of the variables vector $\alpha_i$ which minimize a function based on the discrepancy between the actual flow-rate (Qi) and pressure ($h_i$) values effectively measured and the corresponding theoretical flow-rate ($Q_i^T$) and pressure ($h_i^T$) values, wherein said calculation phase is performed by applying a certain own fitness function $J(\alpha)$ of the genetic algorithms (GAs).

16 Claims, 19 Drawing Sheets

(51) Int. Cl.
  G01F 25/00 (2006.01)
  B08B 9/032 (2006.01)
(58) Field of Classification Search
  USPC .......... 702/45, 47, 48, 50, 51, 179, 181; 72/284; 382/128
  See application file for complete search history.

(56) References Cited

U.S. PATENT DOCUMENTS

2006/0218985 A1* 10/2006 Kenmochi ............... B21C 1/26
  72/284
2008/0219529 A1* 9/2008 Alexandrov ......... G06K 9/6228
  382/128

OTHER PUBLICATIONS

Silvia Meniconi, et al., "Small Amplitude Sharp Pressure Waves to Diagnose Pipe Systems", Water Resources Management, vol. 25, No. 1, XP 019868919, 2011, pp. 79-96.

Li-Peng Liu, et al., "Inverse Analysis of Frictional Coefficients of Pipelines Based on PSO", Proceedings of the Sixth International Conference on Machine Learning and Cybernetics, XP 031153942, Aug. 19-22, 2007, pp. 920-924.

* cited by examiner

| test | | PL1 | PL2 | PL4 | PL8 | PL6 | PL7 | PL9 |
|---|---|---|---|---|---|---|---|---|
| S1-M1-N0 | target | 1.00 | 1.00 | 0.75 | 1.00 | 1.00 | 1.00 | 1.00 |
| | $\mu(IDs)$ | 0.9876 | 0.9827 | 0.7565 | 0.9859 | 0.9998 | 0.9999 | 0.9965 |
| | $\mu(IDs) + O.A.$ | 0.9855 | 0.9855 | 0.7557 | 0.9864 | 0.9998 | 0.9999 | 0.9968 |
| | $\sigma(IDs) * 100$ | 1.3557 | 1.3240 | 0.4764 | 0.8673 | 0.0403 | 0.0239 | 0.2519 |
| | $\sigma(IDs) * 100 + O.A.$ | 1.4326 | 1.1633 | 0.4159 | 0.8511 | 0.0296 | 0.0177 | 0.2334 |
| S2-M1-N0 | target | 1.00 | 1.00 | 1.00 | 1.00 | 1.00 | 1.00 | 0.95 |
| | $\mu(IDs)$ | 0.9985 | 0.9991 | 0.9995 | 0.9999 | 0.9999 | 1.00 | 0.9508 |
| | $\mu(IDs) + O.A.$ | 0.9983 | 0.9997 | 0.9994 | 1.00 | 1.00 | 1.00 | 0.9505 |
| | $\sigma(IDs) * 100$ | 0.3030 | 0.3856 | 0.1057 | 0.0712 | 0.0411 | 0.0008 | 0.2566 |
| | $\sigma(IDs) * 100 + O.A.$ | 0.3215 | 0.0734 | 0.1119 | 0.0033 | 0.0106 | 0.0002 | 0.1444 |
| S3-M1-N0 | target | 1.00 | 1.00 | 0.96 | 0.93 | 1.00 | 0.90 | 1.00 |
| | $\mu(IDs)$ | 0.9860 | 0.9935 | 0.9710 | 0.9251 | 0.9997 | 0.8996 | 0.9987 |
| | $\mu(IDs) + O.A.$ | 0.9915 | 0.9940 | 0.9711 | 0.9277 | 0.9999 | 0.9000 | 0.9992 |
| | $\sigma(IDs) * 100$ | 2.1642 | 0.6191 | 0.8087 | 1.2315 | 0.0815 | 0.1338 | 0.2462 |
| | $\sigma(IDs) * 100 + O.A.$ | 0.9588 | 0.5346 | 0.6227 | 0.1724 | 0.0178 | 0.0226 | 0.0589 |
| S4-M1-N0 | target | 0.95 | 0.90 | 1.00 | 0.95 | 1.00 | 1.00 | 1.00 |
| | $\mu(IDs)$ | 0.9493 | 0.9101 | 0.9862 | 0.9537 | 0.9997 | 0.9997 | 0.9997 |
| | $\mu(IDs) + O.A.$ | 0.9467 | 0.9106 | 0.9864 | 0.9531 | 0.9997 | 0.9998 | 0.9999 |
| | $\sigma(IDs) * 100$ | 2.0676 | 0.4189 | 1.0167 | 0.4516 | 0.0606 | 0.0598 | 0.02068 |
| | $\sigma(IDs) * 100 + O.A.$ | 1.8836 | 0.3997 | 0.8467 | 0.3941 | 0.0311 | 0.0352 | 0.0220 |
| S5-M2-N0 | target | 1.00 | 1.00 | 1.00 | 1.00 | 1.00 | 1.00 | 1.00 |
| | $\mu(IDs)$ | 0.9949 | 0.9910 | 0.9070 | 0.9976 | 0.9999 | 1.00 | 0.9992 |
| | $\mu(IDs) + O.A.$ | 0.9949 | 0.9922 | 0.9059 | 0.9982 | 1.00 | 1.00 | 0.9993 |
| | $\sigma(IDs) * 100$ | 0.5987 | 0.7737 | 0.4689 | 0.2356 | 0.04245 | 0.0052 | 0.0684 |
| | $\sigma(IDs) * 100 + O.A.$ | 0.6308 | 0.6627 | 0.3315 | 0.1536 | 0.0125 | 0.0049 | 0.0447 |

Fig. 14

| test | target | PL1 | PL2 | PL4 | PL8 | PL6 | PL7 | PL9 |
|---|---|---|---|---|---|---|---|---|
| S2-M2-N2 | target | 1.00 | 1.00 | 1.00 | 1.00 | 1.00 | 1.00 | 0.95 |
| | $\mu(IDs)$ | 0.96228 | 0.97901 | 0.98679 | 0.99635 | 0.9964 | 0.99602 | 0.96611 |
| | $\mu(IDs) + O.A.$ | 0.99014 | 0.99229 | 0.99923 | 0.9999 | 0.99941 | 0.99952 | 0.96863 |
| | $\sigma(IDs) * 100$ | 7.8669 | 3.9296 | 3.1298 | 1.3893 | 0.85866 | 1.0382 | 2.4650 |
| | $\sigma(IDs) * 100 + O.A.$ | 2.5325 | 2.2626 | 0.36614 | 0.033004 | 0.16104 | 0.13358 | 2.0098 |
| S3-M2-N2 | target | 1.00 | 1.00 | 0.96 | 0.93 | 1.00 | 0.90 | 1.00 |
| | $\mu(IDs)$ | 0.9517 | 0.9903 | 0.9720 | 0.9390 | 0.9971 | 0.9037 | 0.9970 |
| | $\mu(IDs) + O.A.$ | 0.9873 | 0.9919 | 0.9722 | 0.9388 | 0.9975 | 0.9016 | 0.9974 |
| | $\sigma(IDs) * 100$ | 18.2170 | 1.4957 | 2.0141 | 2.3150 | 0.3766 | 1.9733 | 0.4024 |
| | $\sigma(IDs) * 100 + O.A.$ | 2.6809 | 1.3252 | 2.1032 | 2.126 | 0.3306 | 1.1225 | 0.3459 |
| S2-M3-N2 | target | 1.00 | 1.00 | 1.00 | 1.00 | 1.00 | 1.00 | 0.95 |
| | $\mu(IDs)$ | 0.9971 | 0.9998 | 0.9997 | 0.9998 | 0.9999 | 0.9998 | 0.9577 |
| | $\mu(IDs) + O.A.$ | 1.00 | 0.9999 | 1.00 | 1.00 | 1.00 | 1.00 | 0.9584 |
| | $\sigma(IDs) * 100$ | 1.1640 | 0.0287 | 0.1207 | 0.0706 | 0.0531 | 0.0550 | 1.3055 |
| | $\sigma(IDs) * 100 + O.A.$ | 1.19e-006 | 0.0021 | 0.00 | 4.52e-006 | 7.15e-005 | 4.46e-006 | 1.2271 |

Fig. 15

| case S0-M1-N0 | PL1 | PL2 | PL3 | PL4 | PL6 | PL7 | PL8 |
|---|---|---|---|---|---|---|---|
| target | 1.00 | 1.00 | 1.00 | 1.00 | 1.00 | 1.00 | 1.00 |
| $\mu(IDs)$ | 1.00 | 1.00 | 0.9989 | 0.9988 | 0.9993 | 0.9965 | 0.9998 |
| $\mu(IDs)$ + O.A. | 1.00 | 1.00 | 0.9986 | 0.9986 | 0.9990 | 1.00 | 0.9996 |
| $\sigma(IDs) * 100$ | 0.0077 | 0.0018 | 0.3092 | 0.1884 | 0.2356 | 1.8373 | 0.0709 |
| $\sigma(IDs) * 100$ + O.A. | 0.0094 | 0.00 | 0.3824 | 0.2202 | 0.2891 | 0.0031 | 0.0878 |

| | PL9 | PL10 | PL11 | PL12 | PL13 | PL14 | PL15 |
|---|---|---|---|---|---|---|---|
| target | 1.00 | 1.00 | 0.94 | 0.92 | 0.90 | 1.00 | 1.00 |
| $\mu(IDs)$ | 0.9982 | 0.9964 | 0.9439 | 0.9245 | 0.9017 | 0.9938 | 0.9950 |
| $\mu(IDs)$ + O.A. | 1.00 | 0.9989 | 0.9445 | 0.9247 | 0.9004 | 0.99958 | 0.9998 |
| $\sigma(IDs) * 100$ | 0.9374 | 1.0100 | 1.8691 | 1.6448 | 0.6160 | 3.1839 | 1.9465 |
| $\sigma(IDs) * 100$ + O.A. | 0.0435 | 0.1645 | 1.4925 | 1.2344 | 0.4373 | 0.1706 | 0.0470 |

Fig. 19

| case S0-M1-N1 | PL1 | PL2 | PL3 | PL4 | PL6 | PL7 | PL8 |
|---|---|---|---|---|---|---|---|
| target | 1.00 | 1.00 | 1.00 | 1.00 | 1.00 | 1.00 | 1.00 |
| $\mu(IDs)$ | 0.9987 | 0.9998 | 0.9964 | 0.9941 | 0.9991 | 0.9988 | 0.9970 |
| $\mu(IDs) + O.A.$ | 0.9986 | 1.00 | 0.9968 | 0.9943 | 0.9997 | 0.9997 | 0.9980 |
| $\sigma(IDs)*100$ | 0.2731 | 0.0553 | 0.6549 | 1.2775 | 0.4070 | 0.5190 | 1.0426 |
| $\sigma(IDs)*100 + O.A.$ | 0.2162 | 0.0185 | 0.6167 | 1.3139 | 0.0470 | 0.0906 | 0.4314 |

| | PL9 | PL10 | PL11 | PL12 | PL13 | PL14 | PL15 |
|---|---|---|---|---|---|---|---|
| target | 1.00 | 1.00 | 0.94 | 0.92 | 0.90 | 1.00 | 1.00 |
| $\mu(IDs)$ | 0.9955 | 0.9980 | 0.9531 | 0.9470 | 0.9028 | 0.9836 | 0.9740 |
| $\mu(IDs) + O.A.$ | 0.9927 | 0.9987 | 0.9533 | 0.9491 | 0.9003 | 0.97955 | 0.9697 |
| $\sigma(IDs)*100$ | 0.8030 | 0.3097 | 3.8237 | 6.8917 | 1.2153 | 2.3694 | 4.6332 |
| $\sigma(IDs)*100 + O.A.$ | 0.9752 | 0.1837 | 4.5336 | 6.3108 | 1.3363 | 2.5989 | 5.3713 |

Fig. 20

METHOD FOR IDENTIFYING OBSTRUCTIONS IN PIPELINE NETWORKS FOR TRANSPORTING FLUIDS

CROSS-REFERENCE TO RELATED APPLICATIONS

This application is a National Stage of PCT/IB2013/053910 filed May 14, 2013 and claims the benefit of MI2012A 000838 filed May 15, 2012.

FIELD OF THE INVENTION

The present invention relates to a method for identifying obstructions in pipeline networks for transporting fluids.

DESCRIPTION OF THE BACKGROUND

Pipelines for transporting fluids, whether they be single-phase or multiphase fluids, can be subject to obstructions. Multiphase fluid refers to the combination of various fluids immiscible with each other, called "phases", that can be solid, liquid or gaseous and can be more or less closely mixed to form dispersions, emulsions or foams. Obstruction, on the other hand, means a reduction in the diameter of a certain pipeline, typically due to the progressive fouling of the internal walls of the pipeline itself.

An obstruction can be due, for example, to calcareous encrustations or deposits formed by the accumulation of particles suspended in the fluid in the transporting phase. Other factors which influence the formation of obstructions can be associated with the temperature of the fluid in the transporting phase, specific physico-chemical properties of the fluid itself, but also the geometry of the pipeline (for example the presence of sharp bends, bottlenecks, valves, etc.). The obstruction of a pipeline generally causes a pressure drop for the fluid being transported and, in more serious cases, it can also lead to swelling and explosion of the pipeline itself.

Methods and systems have therefore been conceived for detecting obstructions in pipelines for transporting fluids. One of these methods consists in measuring the pressure drops that take place in each section of a certain pipeline. The data measured are then compared with the data calculated in relation to the contemporaneous flow-rate of the fluid in that certain pipeline section. This method can be defined as being "indirect" as it reveals the restriction through its fluid-dynamic effects, in contrast with "direct" detection methods of restrictions in the internal diameter.

The advantages of this indirect measurement method of pressure drops consist in the fact that it is not invasive and can be applied with continuity under both single-phase and multiphase fluid conditions. In addition, this method can be applied under both stationary and transitory conditions. The most evident disadvantage, however, lies in the fact that this method requires a knowledge of the flow-rates in each section of the pipeline, including the intermediate sections, which, in practice, is normally impossible in pipeline networks, where only flow-rates relating to the end junctions are known or estimated.

Another indirect method that can be used for identifying obstructions in pipelines is the passive noise measurement method. This method consists in measuring particular sound emissions characteristic of certain phenomena, such as the movement of fluids through obstructed sections or through specific components of the transportation plant, such as, for example, regulation valves.

The passive noise measurement method is non-invasive and can be applied in continuity, but can only be used under single-phase fluid conditions (gas or liquid). Furthermore, this method requires the use of suitable transducers and a suitable positioning of the same transducers along the pipeline. The main disadvantage of the passive noise measurement method, however, lies in the limitation of the distance between the position of the transducers and that of the obstructions to be revealed. This distance, limited to a few hundreds of meters, is, in fact, strictly linked to the maximum propagation distance of the sound waves inside the fluid.

A further indirect method that can be used for identifying obstructions in pipelines is the method based on pressure waves, or the "back-pressure method". In other words, this method is based on the generation of a pressure or overpressure wave in the fluid transported inside the pipeline. This overpressure wave travels along the pipeline at a much higher velocity than that of the fluid. The interaction of this wave with possible obstructions present along the pipeline generates overpressure echoes. This method is therefore based on the reception and interpretation of these pressure echoes in order to evaluate the entity of possible obstructions present along the pipeline.

The method based on pressure waves is also non-invasive and also allows restrictions and/or obstructions in very long pipelines, i.e. in the order of hundreds of kilometers, to be detected and localized. This method, however, necessarily requires the use of specific pressure-wave generation equipment, it can only be applied under generically single-phase fluid conditions (gas or liquid), it requires the use of suitable transducers and must be applied separately to each pipeline section of the network.

Yet another method, this time "direct", that can be used for identifying obstructions in pipelines is the so-called "pigging" method. This operates through launching devices known as "pigs" into the pipelines. "Pigs" are particular shaped probes, frequently pushed by the fluid travelling in the pipeline. In addition to removing liquids/sludge/deposits from the pipeline, "pigs" can also effect measurements on the pipeline itself, possibly detecting and localizing restrictions and/or obstructions.

With the "pigging" method, it is possible to effect extremely accurate measurements also in very long pipelines, i.e. in the order of hundreds of kilometers, but the main disadvantage of this method lies in the fact that it is particularly invasive and has the residual risk of causing transportation problems. This method also requires the use of launch and recovery devices of the "pigs" on each section of the pipeline to be inspected: these devices are often unavailable and/or cannot be applied in all sections of the network.

Finally, it should be noted that none of the traditional methods mentioned above for identifying obstructions in pipelines can be conveniently applied to complex pipeline networks. The above methods, on the contrary, are only satisfactory when applied to pipelines free of intermediate inlet or outlet points of the fluids.

BRIEF SUMMARY OF THE INVENTION

An objective of the present invention is therefore to provide a method for identifying obstructions in pipeline networks for transporting fluids, whether they be single-phase or multiphase fluids, that is capable of solving the above drawbacks of the known art in an extremely simple, economical and particularly functional manner.

More specifically, an objective of the present invention is to provide a method for identifying obstructions in pipeline networks for transporting fluids that is in no way invasive, thus preserving the integrity of the pipelines and normal flow of fluid inside the pipelines themselves.

A further objective of the present invention is to provide a method for identifying obstructions in pipeline networks for transporting fluids that allows, with a particularly reduced number of flow-rate and pressure measurements, possible restrictions and/or obstructions to be effectively detected and localized.

Another objective of the present invention is to provide a method for identifying obstructions in pipeline networks for transporting fluids which, through accurate measurements, allows an overall analysis of pipeline networks, also relatively complex and articulated, to be effected.

Yet another objective of the present invention is to provide a method which, in order to detect possible obstructions, exploits normal measurement operations carried out on pipeline networks.

These objectives according to the present invention are achieved by providing a method for identifying obstructions in pipeline networks for transporting fluids as specified in claim 1.

Further characteristics of the invention are indicated in the dependent claims, which are an integrant part of the present description.

BRIEF DESCRIPTION OF THE DRAWINGS

FIGS. 14 and 15 respectively show tables containing the results of the analyses on the network of FIG. 5 after application of the method for identifying obstructions according to the present invention;

FIGS. 19 and 20 respectively show tables containing the results of the analyses on the network of FIG. 16 after application of the method for identifying obstructions according to the present invention.

DETAILED DESCRIPTION OF THE INVENTION

Figure 1:
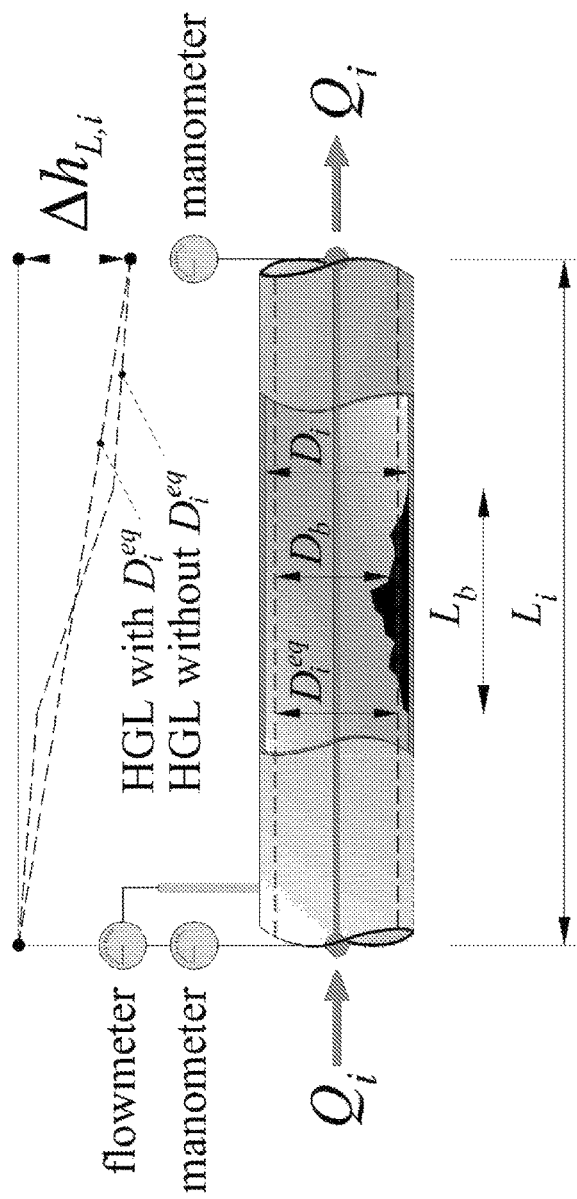
FIG. 1 is a schematic view of a pipeline section for transporting fluids to which the method for identifying obstructions according to the present invention can be applied and which indicates the values related to the pipeline itself and the fluid transported therein.

In general, the method according to the present invention is capable of "indirectly" detecting and identifying possible restrictions and obstructions present in a pipeline network, minimizing the discrepancy between the flow-rates and pressures, measured on site under normal operating conditions, and the corresponding theoretical flow-rates and pressures, obtained from a numerical simulation. At the end of the numerical simulation of flow-rates and pressures in the network, a prescribed numerical model is used.

The obstructions are identified in terms of a reduction in the nominal diameter of a certain pipeline as far as a value equal to the so-called "equivalent diameter". Equivalent diameter refers to a uniform diameter over the whole length of the pipeline which induces a distributed pressure drop equal to that of the pipeline being examined, in which an obstruction is possibly present. Consequently, if the equivalent diameter identified is equal to or close to the nominal diameter of the pipeline, then the method indicates that this pipeline is free of obstructions. If, on the other hand, the equivalent diameter identified is consistently lower than the nominal diameter, then the method indicates that there is probably an obstruction in this pipeline.

The process for determining the equivalent diameter of a pipeline can be described as being an optimization process, in which the target function to be minimized is a metric that represents the discrepancy between the pressure and flow-rate values obtained with the numerical model and the pressure and flow-rate values effectively measured, whereas the parameter to be varied is the uniform internal diameter of the pipeline.

The method according to the invention is capable of quantifying the average effect of an obstruction distributed over the whole length of each pipeline section forming the pipeline network under examination. The project variables of the method according to the invention are composed of the equivalent diameters of the network pipelines, whereas the target function to be minimized is a metric that represents the discrepancy between the pressure and flow-rate values obtained with the numerical model and the pressure and flow-rate values effectively measured. The optimization phase aimed at obtaining equivalent diameters (project variables) of each pipeline can therefore be summarized as follows (|z| indicates the absolute value of the number z):

calculation of the equivalent diameters of each pipeline so that:

|simulated flow-rates−measured flow-rates|=minimum            1.

|simulated pressures−measured pressures|=minimum            2.

According to the invention, the implementation of the optimization phase is obtained by means of genetic algorithms. Genetic algorithms are a popular heuristic operative research instrument inspired by the biological theory of evolution of the species and survival of the fittest individuals. In the present method, an "individual" consists of a value of the equivalent diameter for each single pipeline of the network.

The genetic algorithms evaluate the target function to be minimized (discrepancy between values measured and simulated values) for a certain series of "individuals" consisting of equivalent diameters of each pipeline or pipeline section. The combination of "individuals" forms a "population". Consequently, on the basis of the results obtained for the target function, a new "population" is generated so that there is a better representation of the "individuals" (equivalent diameters of each pipeline or pipeline section) similar to those that produced the best results in the previous generation. Proceeding generation after generation, the genetic algorithms identify with optimum approximation the specific "individual" (equivalent diameter of each pipeline or pipeline section) that gives the least discrepancy between values measured and simulated values. In the most generic case, this approach to the problem is called "parametric system identification".

The method according to the invention can be applied when a certain number of measurements of the pressure values are available, in correspondence with the junction nodes of the network and flow-rate values in the pipelines of the network itself. The minimum number of pressure and flow-rate measurements is not established a priori, but depends on the type of network, its geometrical properties and also its constituent elements. The minimum number of pressure and flow-rate measurements can also be defined through a sensitivity analysis procedure, which establishes whether or not a certain measurement is functional to the application of the method. The sensitivity analysis therefore allows the minimum number of "effective" measurements to be defined, which allow a certain fitness function of the genetic algorithms to be correctly applied. A predefined number of pressure and flow-rate measurements can also be established a priori in order to maximize the sensitivity of the method and identify possible obstructions in particular areas of the pipeline network.

The characteristics and advantages of a method for identifying obstructions in pipeline networks for transporting fluids according to the present invention will appear more evident from the following illustrative and non-limiting description, referring to the enclosed schematic drawings, in which:

FIG. 1 is a schematic view of a pipeline section for transporting fluids to which the method for identifying obstructions according to the present invention can be applied and which indicates the values related to the pipeline itself and the fluid transported therein.

Figures 2A, 2B:
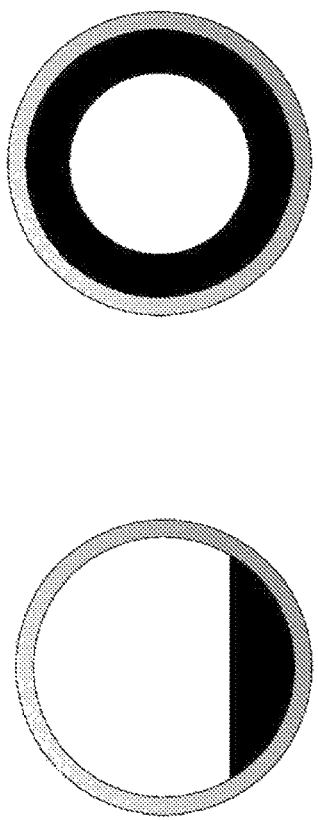
FIG. 2a and FIG. 2b respectively show, in section, two illustrative types of obstructions that can arise in a certain pipeline section.
Figure 3:
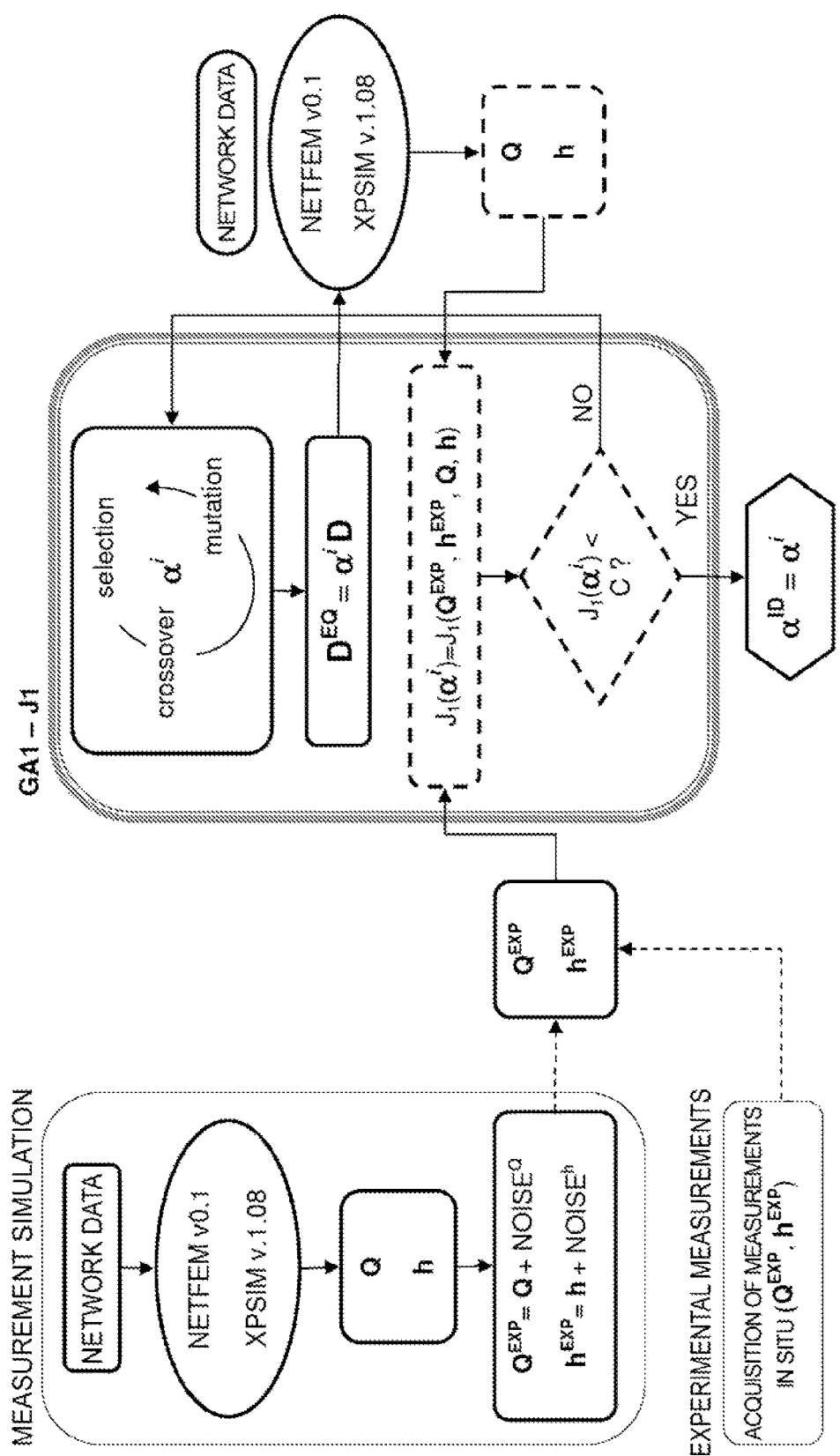
FIG. 3 is a block scheme which illustrates the main phases of a first embodiment of the method for identifying obstructions according to the present invention.
Figure 4:
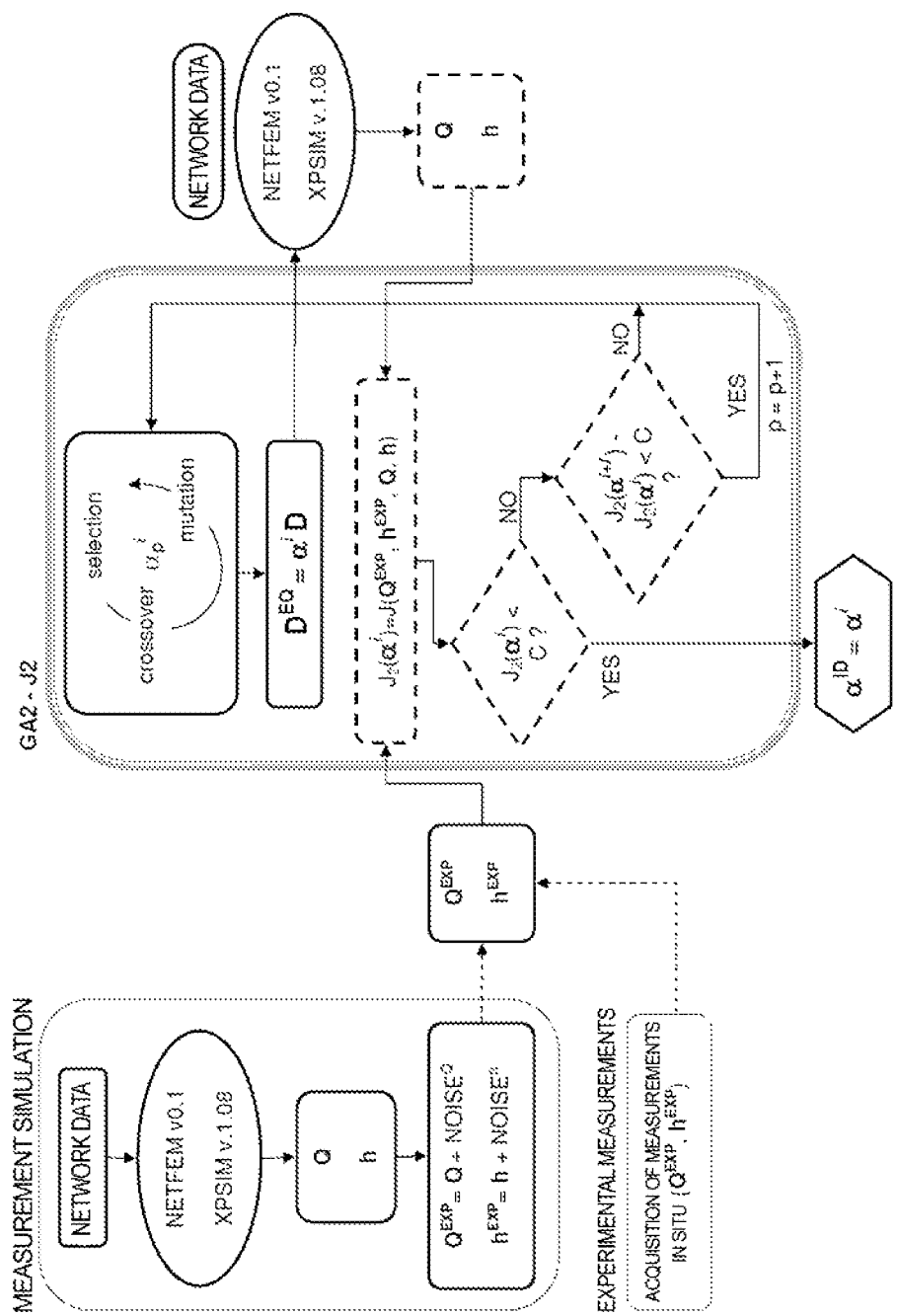
FIG. 4 is a block scheme which illustrates the main phases of a second embodiment of the method for identifying obstructions according to the present invention.
Figure 5:
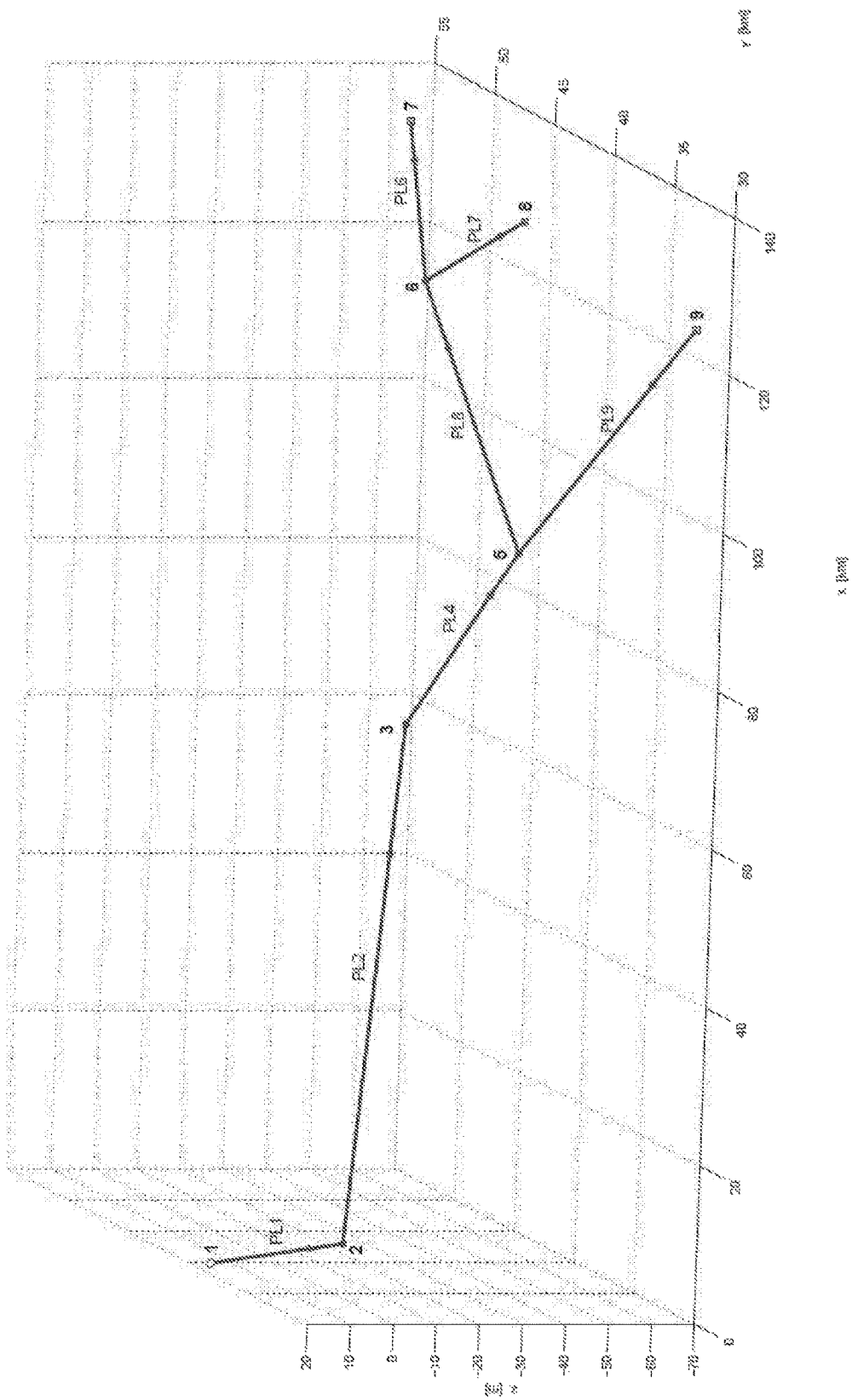
FIG. 5 schematically shows a first embodiment of a pipeline network for transporting a mixture of methane-octane C1-NC8 to which the method for identifying obstructions according to the present invention has been applied.
Figure 6:
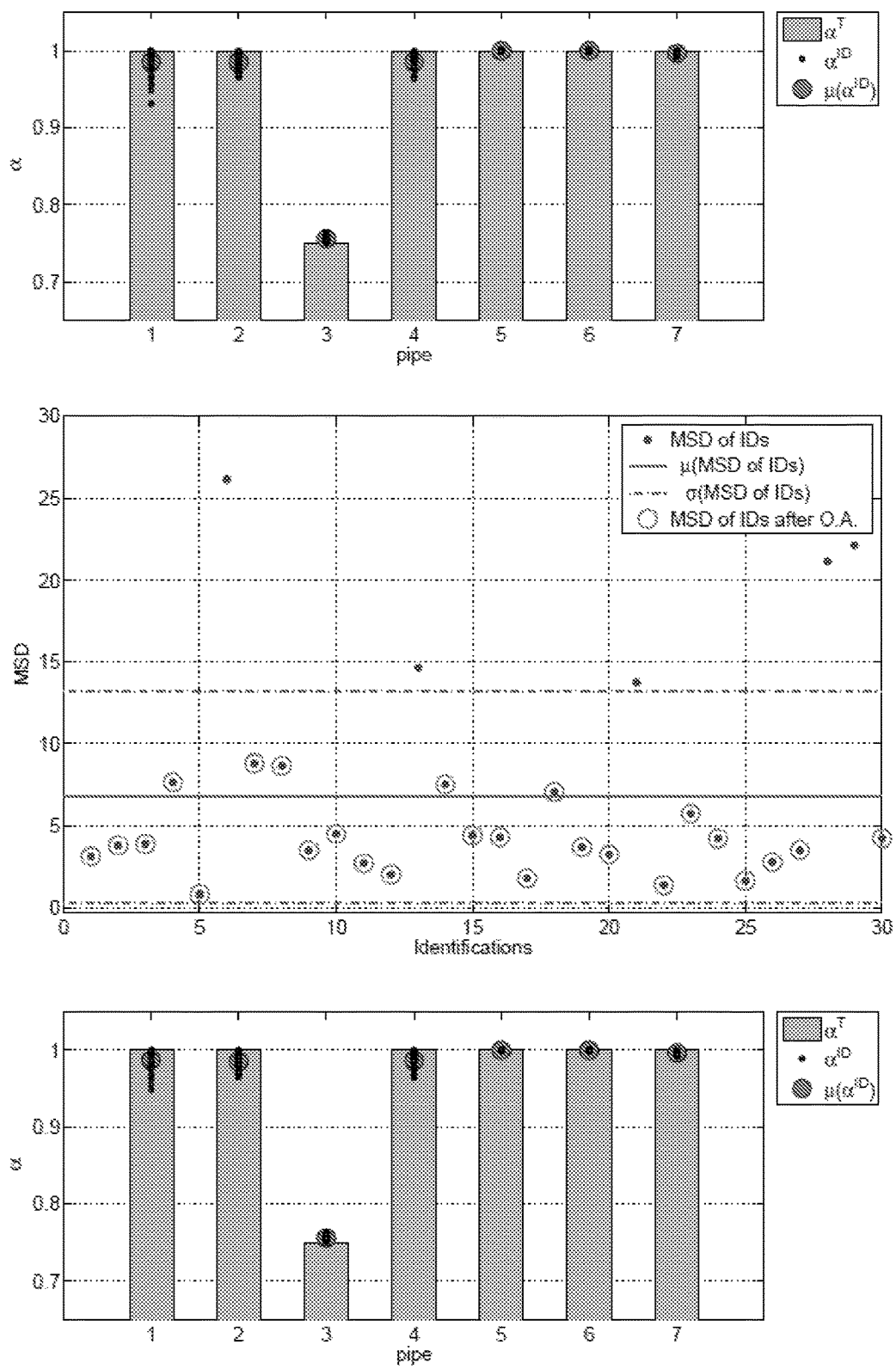
FIGS. 6-13 show the results of the analysis on the network of FIG. 5 after application of the method for identifying obstructions according to the present invention.
Figure 7:
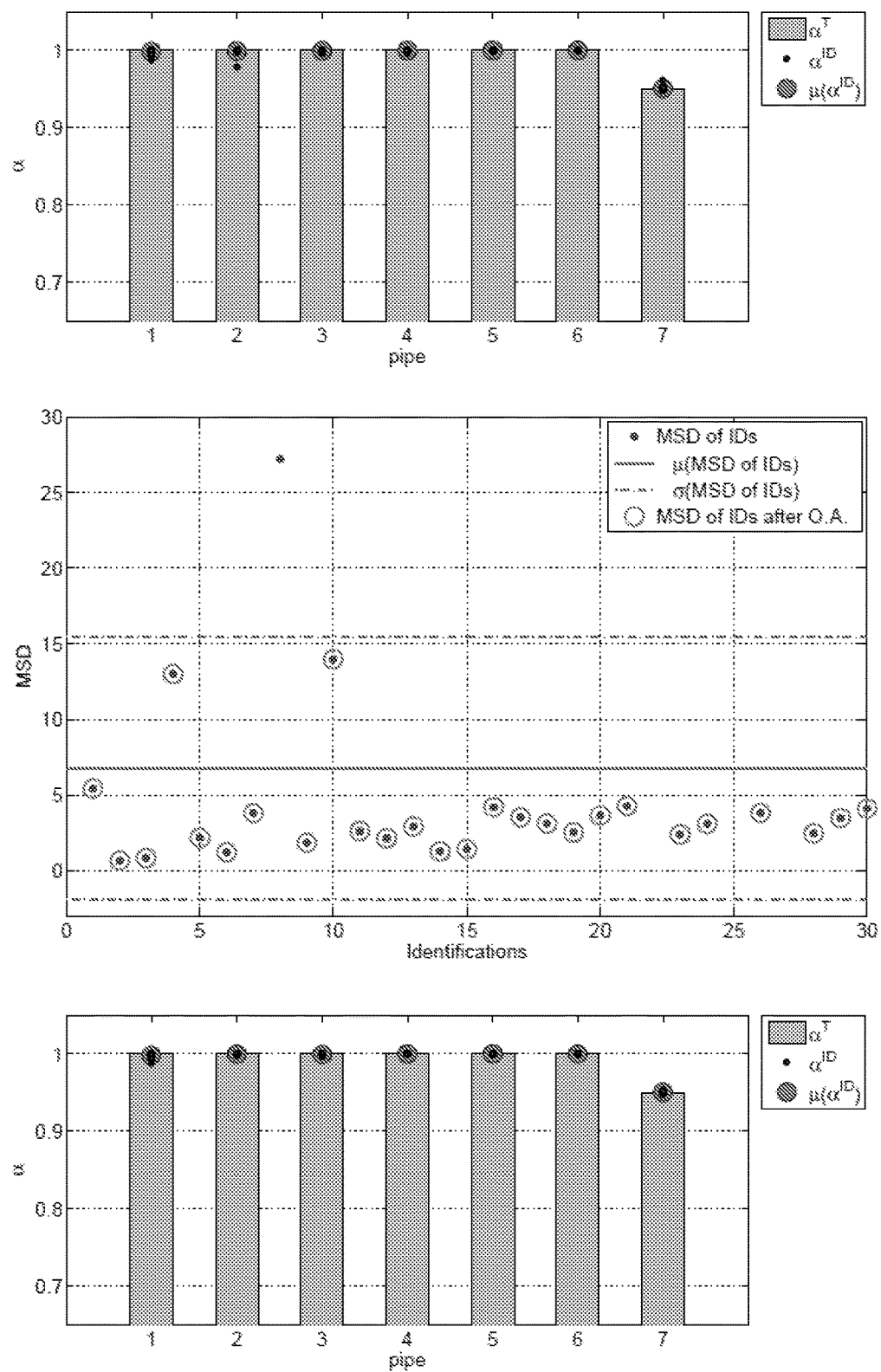
Figure 8:
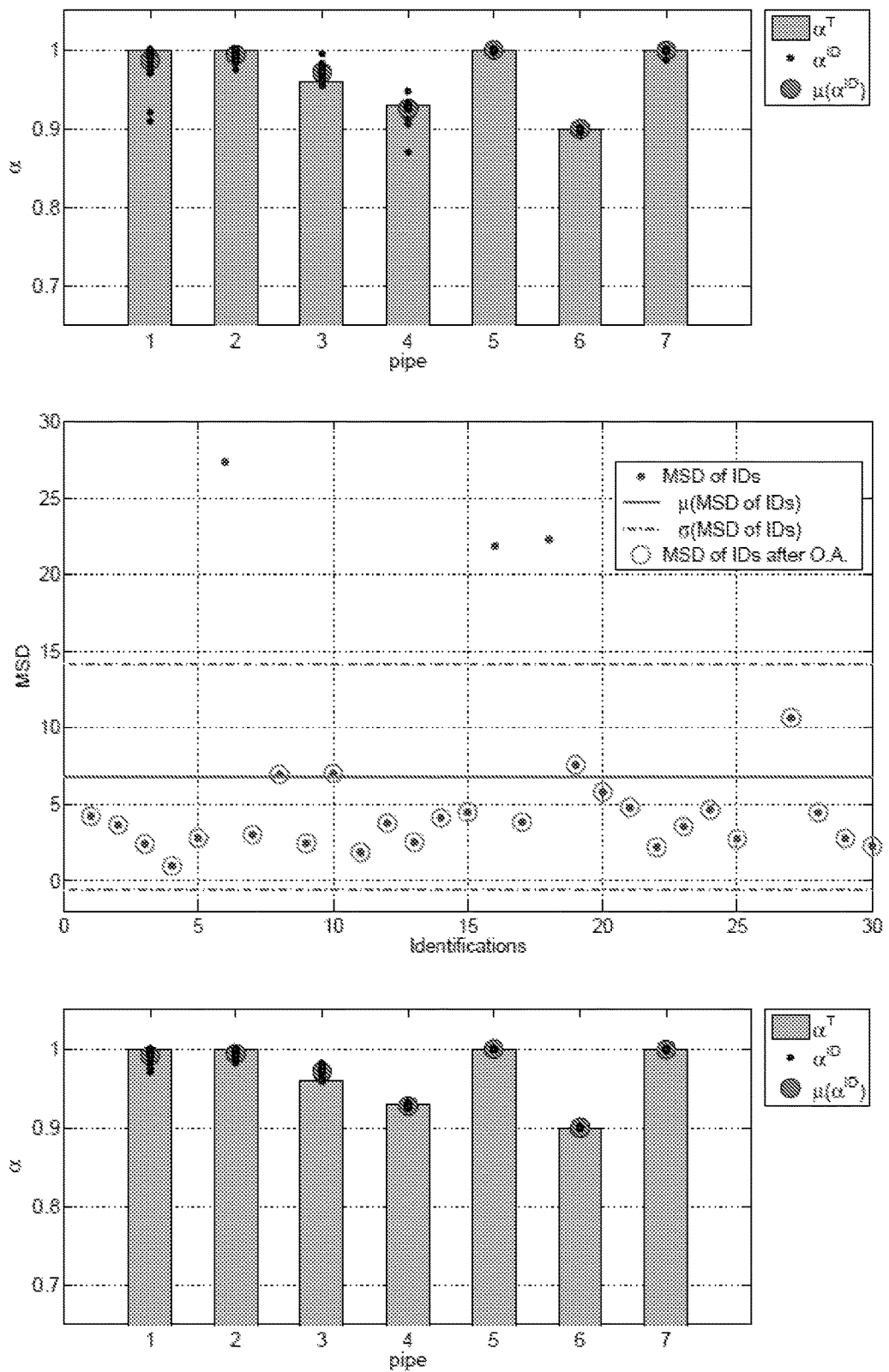
Figure 9:
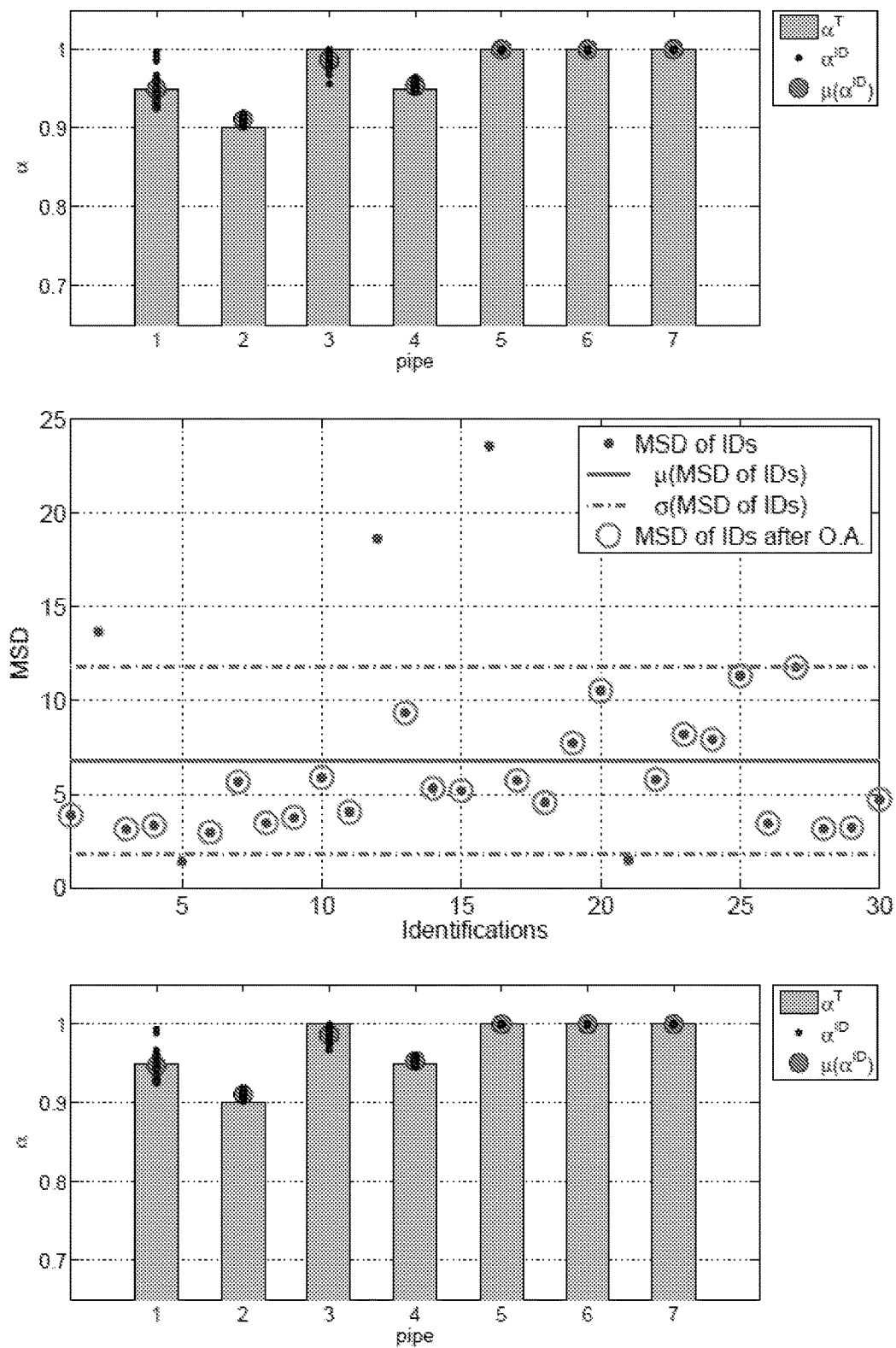
Figure 10:
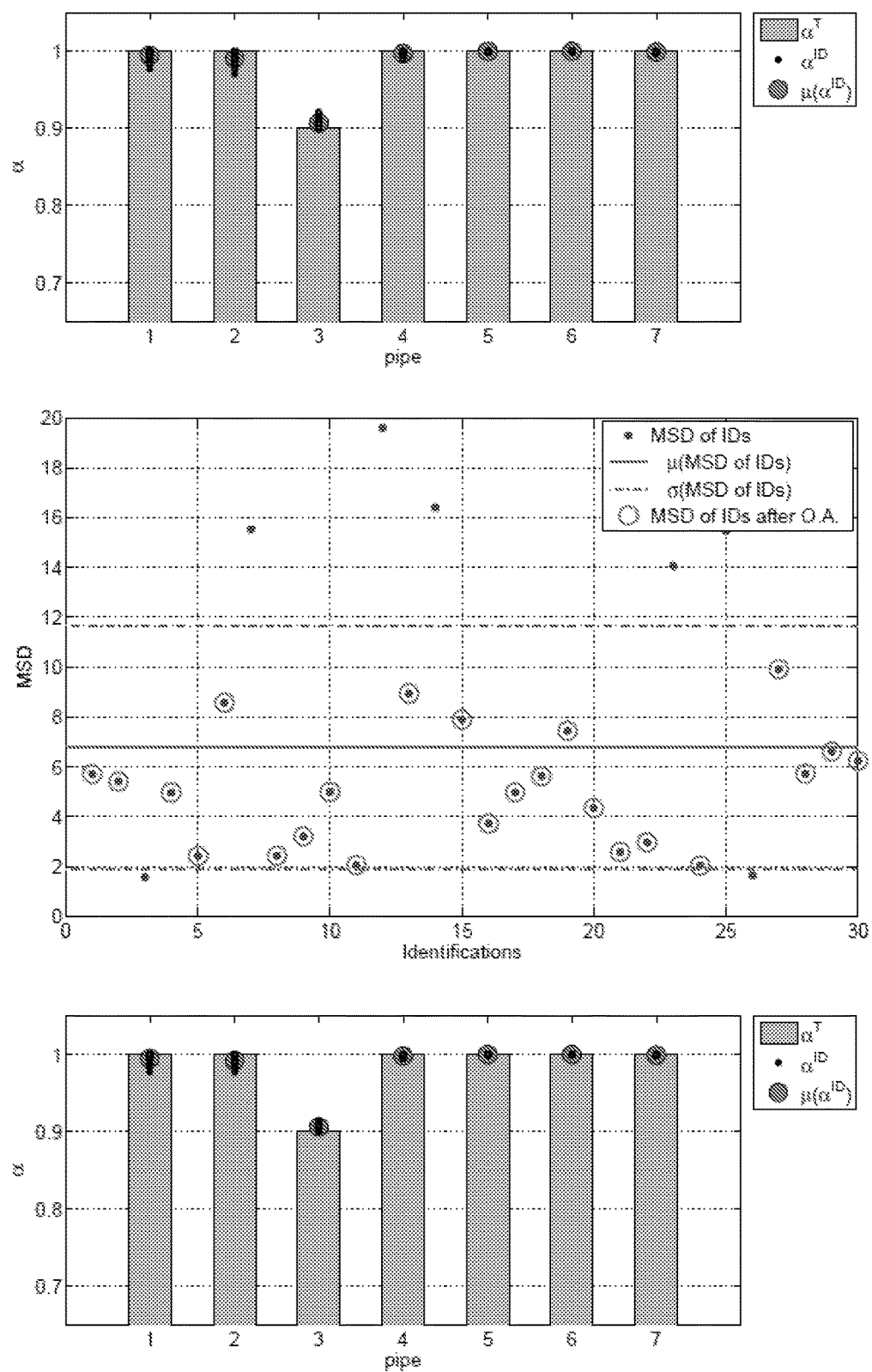
Figure 11:
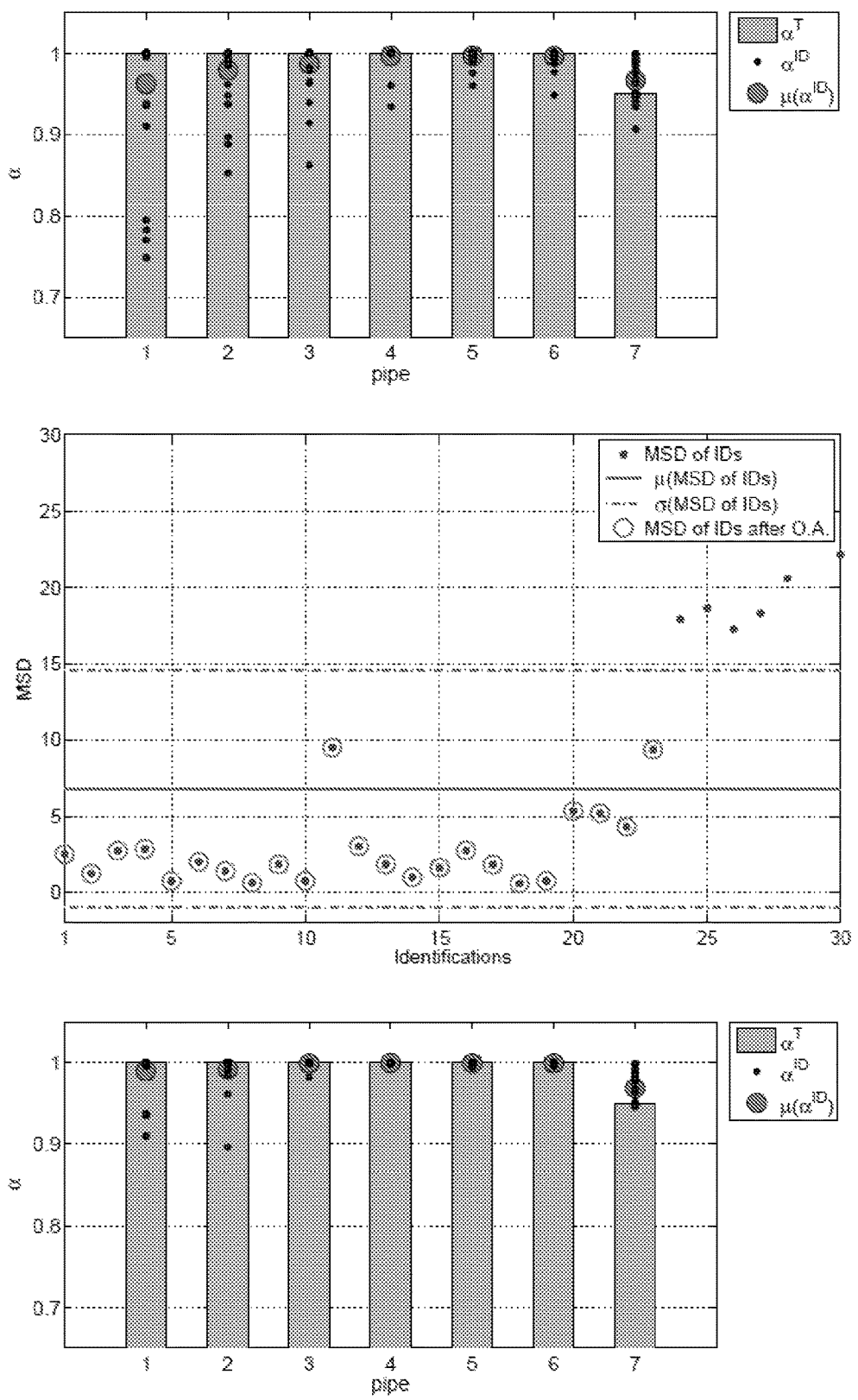
Figure 12:
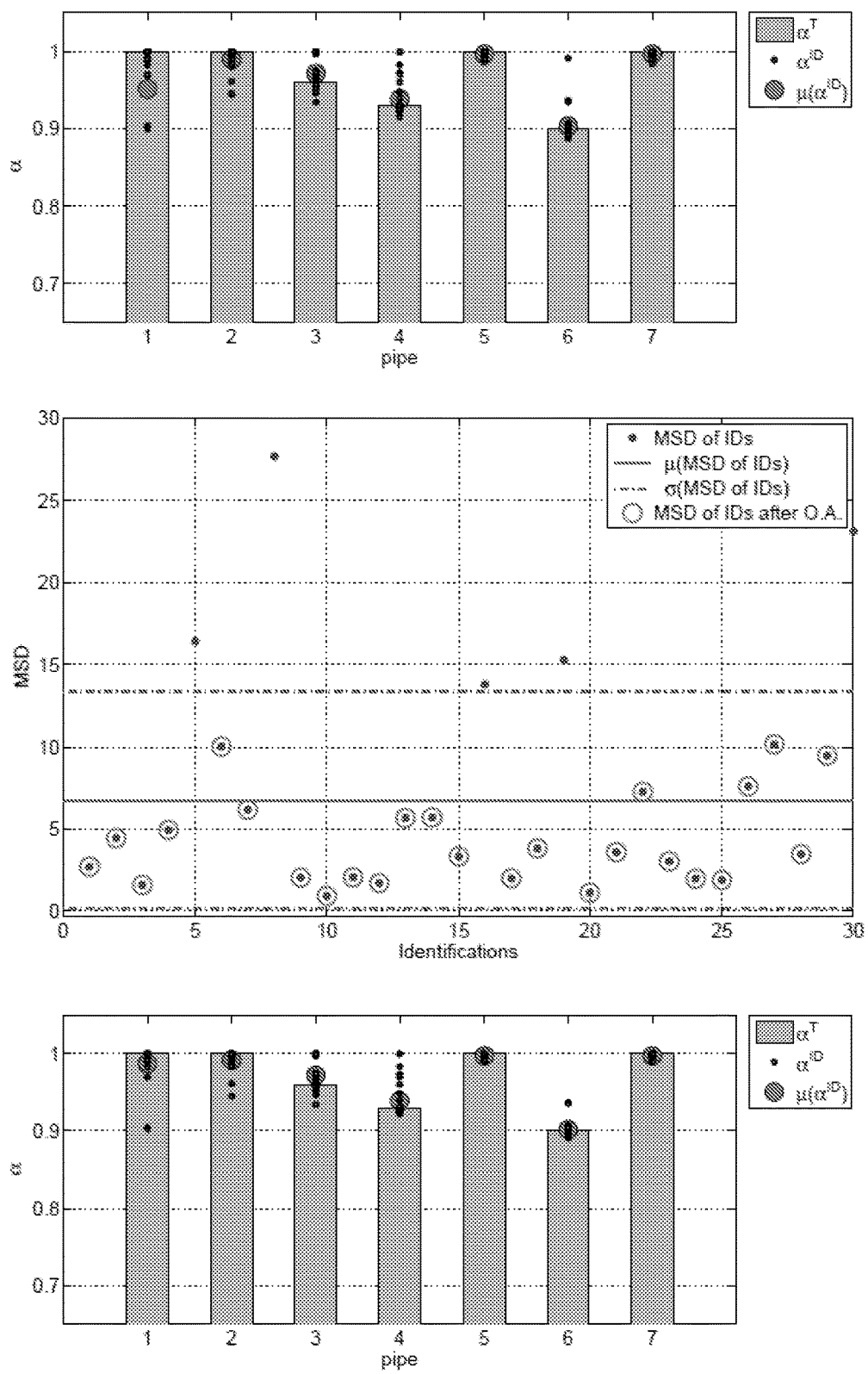
Figure 13:
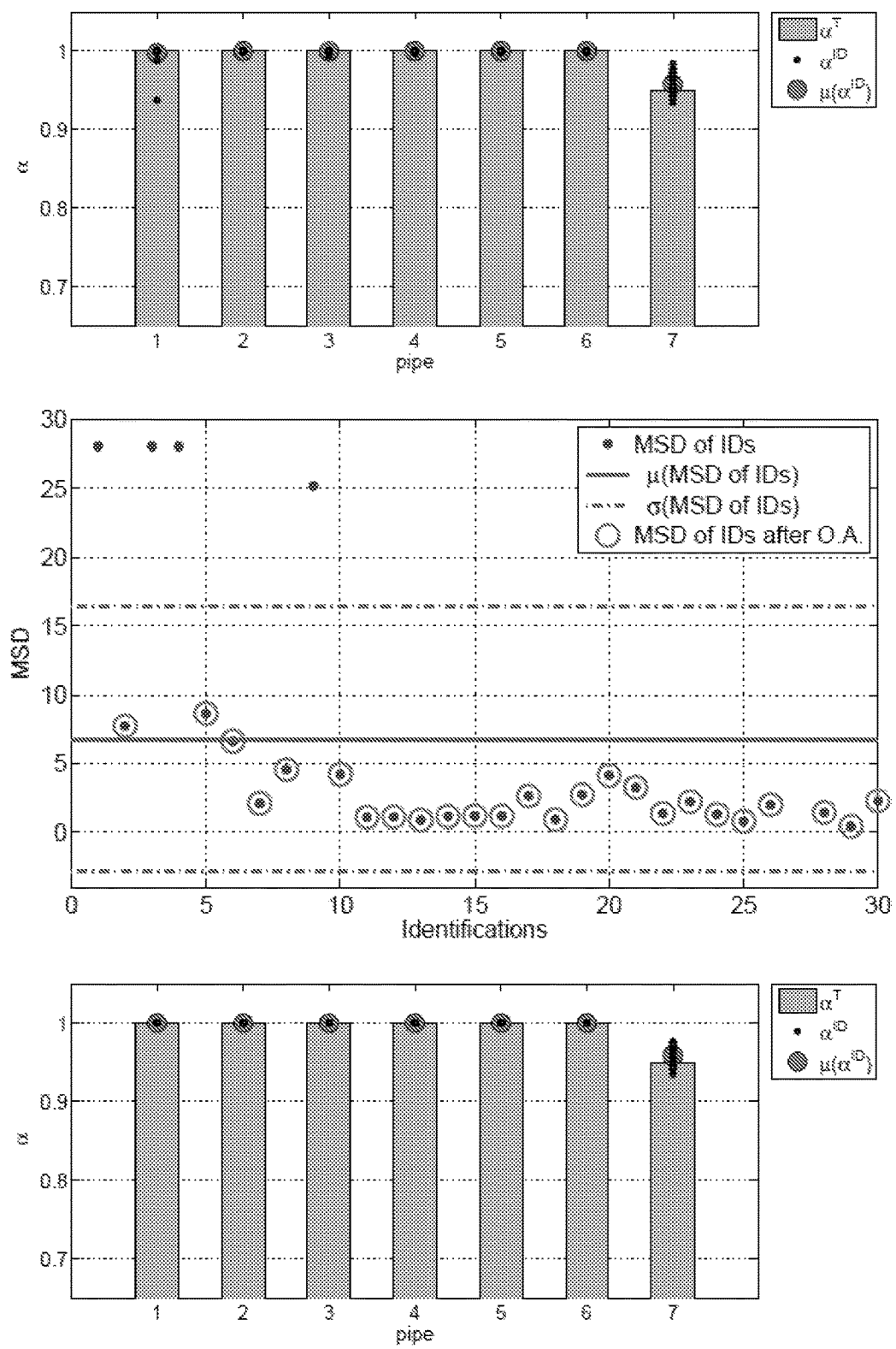
Figure 16:
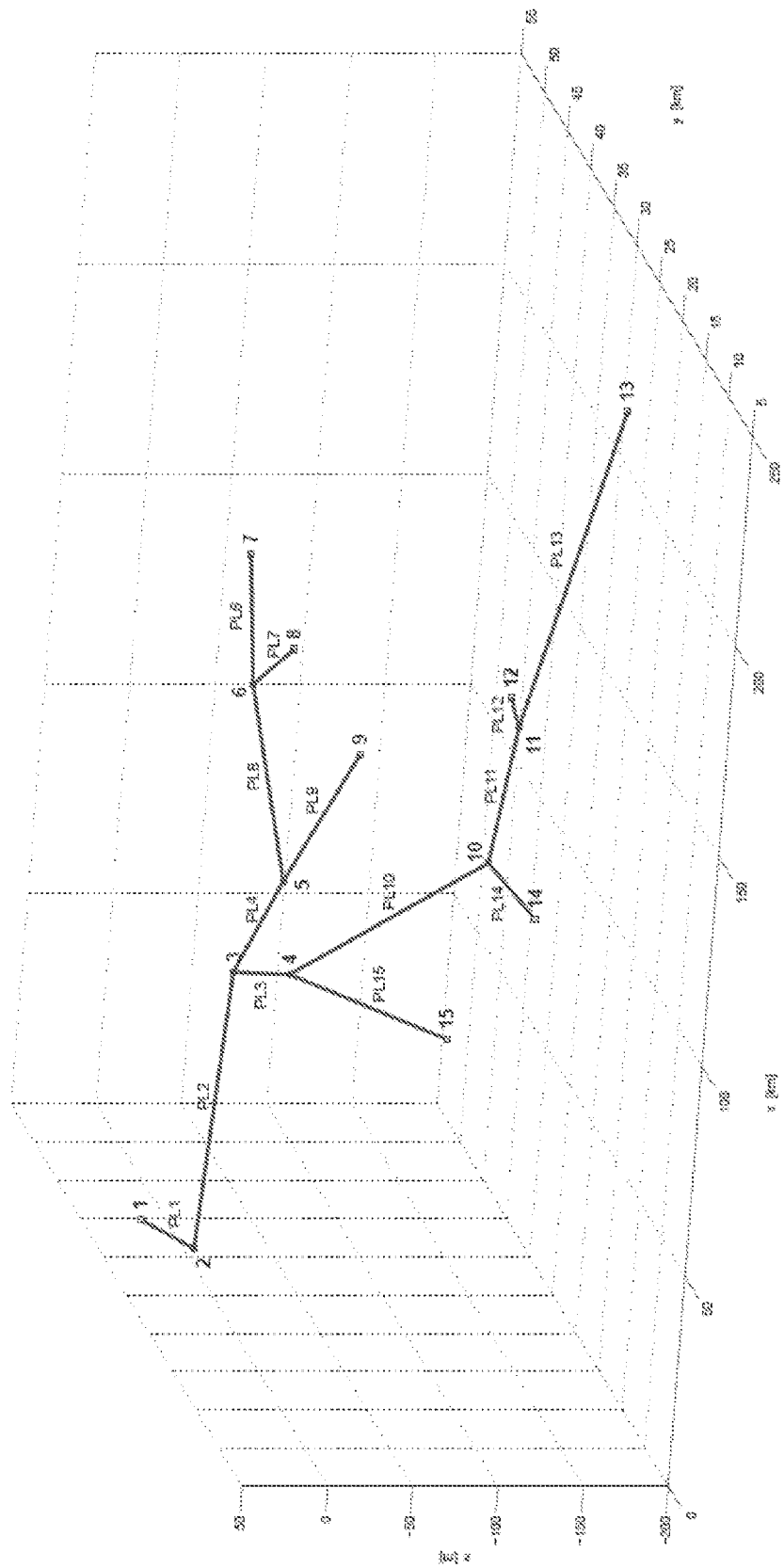
FIG. 16 schematically shows a second embodiment of a pipeline network for transporting a mixture of methane-octane C1-NC8 to which the method for identifying obstructions according to the present invention has been applied.
Figure 17:
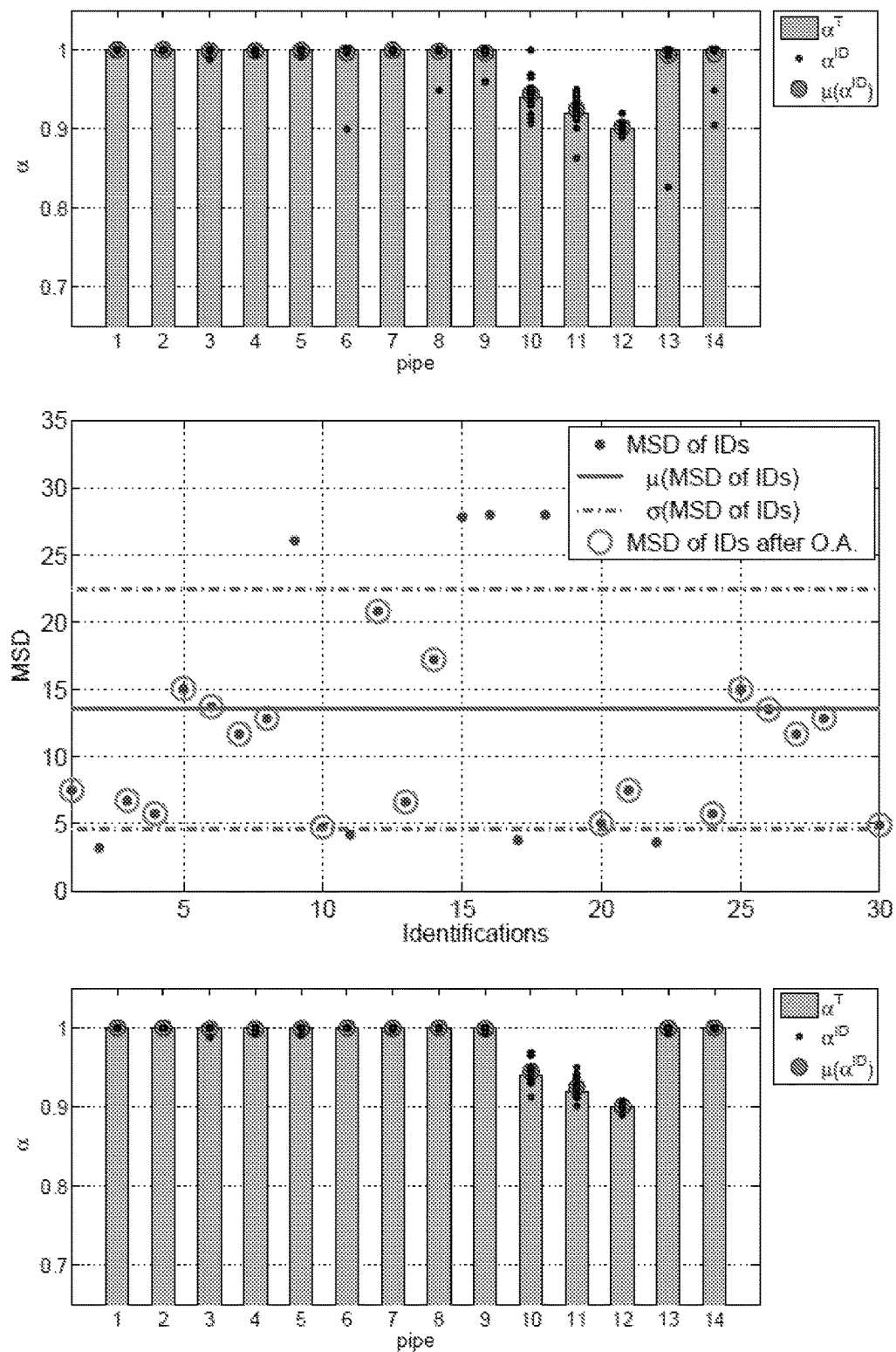
FIGS. 17 and 18 respectively show charts containing the results of the analyses on the network of FIG. 16 after application of the method for identifying obstructions according to the present invention.
Figure 18:
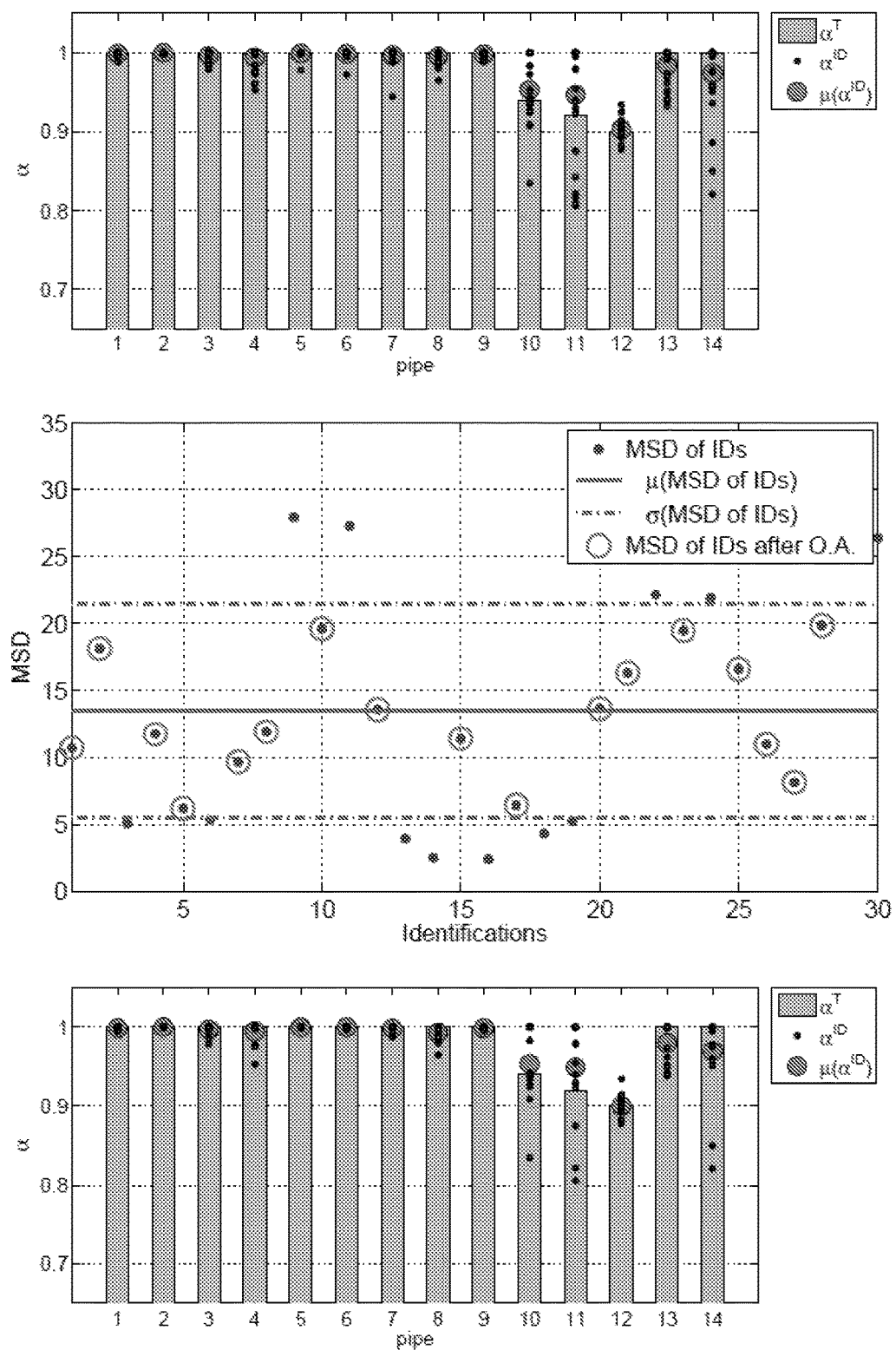

FIGS. 2a and 2b respectively show, in section, two illustrative types of obstructions that can arise in a certain pipeline section;

FIG. 3 is a block scheme which illustrates the main phases of a first embodiment of the method for identifying obstructions according to the present invention;

FIG. 4 is a block scheme which illustrates the main phases of a second embodiment of the method for identifying obstructions according to the present invention;

FIG. 5 schematically shows a first embodiment of a pipeline network for transporting a mixture of methane-octane C1-NC8 to which the method for identifying obstructions according to the present invention has been applied;

FIGS. 6-13 show the results of the analysis on the network of FIG. 5 after application of the method for identifying obstructions according to the present invention;

FIGS. 14 and 15 respectively show tables containing the results of the analyses on the network of FIG. 5 after application of the method for identifying obstructions according to the present invention;

FIG. 16 schematically shows a second embodiment of a pipeline network for transporting a mixture of methane-octane C1-NC8 to which the method for identifying obstructions according to the present invention has been applied;

FIGS. 17 and 18 respectively show charts containing the results of the analyses on the network of FIG. 16 after application of the method for identifying obstructions according to the present invention; and FIGS. 19 and 20 respectively show tables containing the results of the analyses on the network of FIG. 16 after application of the method for identifying obstructions according to the present invention.

With reference to the figures, these show a method for identifying obstructions in pipeline networks for transporting fluids according to the present invention, wherein the network is composed of a predefined number of pipeline sections (P) and a predefined number of junction nodes (N). Each pipeline section P is defined as a combination of interconnected pipes having uniform characteristics with respect to diameters, flow-rates and material of which said pipes are made, whereas each junction node N is defined as the connection point of two or more sections of pipeline P, or the end point in which a certain pipeline P is not connected with other pipeline sections P.

The method essentially comprises a first acquisition phase of geometrical data of the sections of pipeline P for which the presence of blockages/obstructions is to be evaluated, in addition to a measurement phase of the effective flow-rate values Q of the fluid in one or more predefined points of the sections of pipeline P and a measurement phase of the effective pressure values h of the same fluid in correspondence with one or more junctions N of the network.

More specifically, the preliminary phases of the method comprise identification of the network, composed for example of a number of pipeline sections P, on the basis of the relative basic characteristics, i.e.:

topology of the network (inlets, outlets, connections), length $L_i$ of each pipeline section $P_i$, elevation of the junctions N, nominal diameters $D_i$ of the pipeline section $P_i$, roughness of the pipeline sections $P_i$;

constrains of the fluid transported by the network (pressures $h_i$, flow-rates $Q_i$, temperatures $T_i$, percentages of the components of the fluid mixture);

calculation parameters of the network (measurement unit, components of the fluid mixture).

The actual flow-rate $Q_i$ and pressure $h_i$ values, that can be measured for example by means of specific flowmeters and manometers situated along the respective sections of pipeline $P_i$ and junctions $N_j$ (FIG. 1), can be corrupted through an aleatory noise threshold, in order to simulate both the measurement uncertainty and non-perfect stationarity of the fluid flow inside the network, before being used in the resolution of the method according to the invention, as will be better specified hereunder.

The noise is added to the flow-rate values $Q_i$ and pressure values $h_i$ measured, as follows:

$$Q_{i,P}^{EXP}=Q_{i,P}(1+nl_Q \times \beta_{i,P}^Q) \forall P$$

$$h_{i,N}^{EXP}=h_{i,N}(1+nl_h \times \beta_{i,N}^h) \forall N$$

wherein $Q_{i,P}^{EXP}$ and $h_{i,N}^{EXP}$ are respectively flow-rate and pressure values affected by the noise, $nl_Q$ and $nl_h$ are respectively predefined noise levels for the flow-rate data $Q_i$ and pressure data $h_i$, whereas $\beta_{i,P}^Q$ and $\beta_{i,N}^h$ are aleatory variables having a normal distribution with null average and standard unitary deviation, which vary for each pipeline section (P) and each junction (N) of the network, respectively.

Any possible obstructions in the pipeline sections P are identified in terms of a reduction in its diameter $D_i$ down to a value equal to an equivalent diameter $D_i^{eq}$. Equivalent diameter $D_i^{eq}$ refers to a uniform diameter over the whole length of a pipeline section P which induces a distributed pressure drop $\Delta h_{L,i}$ equal to that of the same pipeline section P in which there is a certain obstruction. Consequently, if for a generic i-th pipeline section $P_i$ of the network and for a given scenario of obstructions, it is verified that:

$$D_i^{eq} = D_i$$

this means that the i-th pipeline section $P_i$ is substantially free of obstructions. If, on the other hand, it is verified that:

$$D_i^{eq} < D_i$$

this means that the i-th pipeline section $P_i$ probably has a blockage or obstruction whose entity must be verified. The value $D_i^{eq}$ is calculated as:

$$D_i^{eq} = \left[ L_i \left( \sum_j \frac{L_j}{D_j^5} \right)^{-1} \right]^{1/5}$$

wherein $i = 1, 2, \ldots, n_{pipelines}$

Given that:

$$D_i^{eq} = \alpha_i \times D_i$$

the target of the method according to the invention is to calculate the value of the vector of variables $\alpha_i$ that minimize a function based on the discrepancy between the flow-rate values $Q_i$ (or $Q_i^{EXP}$) and pressure values $h_i$ (or $h_i^{EXP}$) effectively measured and the corresponding theoretical flow-rate values $Q_i^T$ and pressure values $h_i^T$ obtained with a specific numerical model. The above calculation phase of the variables $\alpha_i$ is effected by applying the technique of genetic algorithms (GAs).

The genetic algorithm operates as follows. Having fixed a predefined number m of elements of the population, composed of equivalent diameters $D_i^{eq}$, proper functions of the genetic algorithms generate m elements $\alpha_i$ (wherein $i = 1, 2, \ldots, m$), wherein $\alpha$ is a vector of real positive dimensionless numbers having a dimension equal to the number of pipeline sections P of the network. For each element $\alpha_i$ the algorithm creates a combination of equivalent diameters $D_i^{eq} = \alpha_i \times D_i$. A calculation phase of the theoretical flow-rate values $Q_i^T$ and pressure values $h_i^T$ of the fluid is then effected for a given combination of equivalent diameters $D_i^{eq}$ of the sections of pipeline P.

The theoretical flow-rate values $Q_i^T$ and pressure values $h_i^T$ calculated for a certain combination of equivalent diameters $D_i^{eq}$ are inserted in a fitness function $J(\alpha)$ which, for that certain set of equivalent diameters $D_i^{eq}$, measures the distance or discrepancy between the actual flow-rate values $Q_i$ and pressure values $h_i$, preferably those affected by noise $Q_i^{EXP}$ and $h_i^{EXP}$, and said theoretical flow-rate values $Q_i^T$ and pressure values $h_i^T$.

On the basis of a first embodiment of the method, the fitness function $J(\alpha)$ is obtained as follows:

$$J_1 = \left\{ \begin{array}{l} \log\left[ \sum_{j=1}^{n_k} \left( \frac{h_j^{EXP} - h_j^c(\alpha)}{h_j^{EXP}} \right)^2 \right] + \\ \log\left[ \sum_{k=1}^{n_Q} \left( \frac{Q_k^{EXP} - Q_k^c(\alpha)}{Q_k^{EXP}} \right)^2 \right] - \frac{\gamma}{n_P} \sum_{i=1}^{n_P} \alpha_i \end{array} \right\}$$

wherein $\gamma$ is a penalization parameter, or "penalty factor", which reduces the number of false positive values caused by the presence of noise on the real flow-rate $Q_i$ and pressure $h_i$ values, and which is selected in relation to the topology of the network (preferably equal to 5.25), $h_j^{EXP}$ and $Q_k^{EXP}$ are the real pressure and flow-rate values respectively, affected by noise for the j-th junction $N_j$ and k-th pipeline $P_k$, $n_h$ is the total number of pressure measurements at the junctions N and $n_o$ is the total number of flow-rate measurements in the pipeline sections P.

In the case of lack of pressure $h_i$ and/or flow rate $Q_i$ measurements, $n_h < n_N$ and/or $n_Q < n_P$ are respectively assumed, wherein $n_P$ is the number of pipeline sections P and $n_N$ is the number of junction nodes N of the network.

The fitness function $J_1$ can be well adapted to any type of network and provides optimum results with noise of the realistic measurements (also in the order of 10%) and in the case of lack of measurements. It requires, however, that previous numerical analyses be effected to establish the most suitable value of the "penalty factor" $\gamma$.

On the basis of another embodiment of the method, the fitness function $J(\alpha)$ is obtained as follows:

$$J_2 = \sum_{j=1}^{n_h} \left( \frac{h_j^{EXP} - h_j^c(\alpha)}{h_j^{EXP}} \right)^2 + \sum_{k=1}^{n_Q} \left( \frac{Q_k^{EXP} - Q_k^c(\alpha)}{Q_k^{EXP}} \right)^2$$

wherein, also in this case, $h_j^{EXP}$ and $Q_k^{EXP}$ are the actual pressure and flow-rate values respectively, affected by noise for the j-th junction node $N_j$ and k-th pipeline section $P_k$, $n_h$ is the total number of pressure measurements at the junctions N, and $n_Q$ the total number of flow-rate measurements in the pipeline sections P.

The fitness function $J_2$ is particularly effective for loop networks and provides extremely accurate results for networks with medium-small dimensions. Furthermore, it does not require any previous numerical analysis.

Regardless of the type of fitness function $J(\alpha)$, the genetic procedure orders the elements of the population of individuals $\alpha_i$ in relation to the quality of their solution $J(\alpha_i)$. If none of the values $J(\alpha_i)$ satisfies certain predefined convergence and/or tolerance criteria, sub-algorithms of the genetic algorithms (elitism, crossover, mutation) generate a new population of individuals $\alpha_i$, starting from that used in the current generation. The new population of individuals $\alpha_i$ is then used for creating new sets of equivalent diameters $D_i^{eq}$, of which the respective solution $J(\alpha_i)$ of the fitness function $J(\alpha)$, is evaluated, and so forth.

The crossover sub-algorithm exerts the role played by reproduction in nature: it generates a new individual by mixing the information contained in two individuals called "parents". This, in short, is a typically binary operator that allows the information of two individuals to be combined to produce new individuals that maintain the genetic endowment of the parents. Mutation is a unary operator which reintroduces one or more discarded individuals into the population. Elitism is an evolutionary strategy which completes the substitution process of the population. When a new population is created with crossover and mutation, there is a strong probability of losing the best individual. Simple elitism is a sub-algorithm which first copies the best individual (or the few best) in a new population and then proceeds with the logic previously expressed. Elitism can rapidly increase the performances of the genetic algorithm as it avoids the loss of the best solution found.

When a particular combination of equivalent diameters $D_i^{eq}$ satisfies a certain stoppage criterion of the genetic procedure, the genetic algorithm returns the relative element to the population, indicated with $\alpha^{ID}$, which can be easily used for determining the final combination $D_P^{ID}$ of equivalent diameters $D_i^{eq}$ identified, i.e.:

$$D_P^{ID} = \alpha_P^{ID} \times D_P \forall P$$

wherein P indicates the generic pipeline section.

In order to eliminate incoherent identifications generated by the genetic algorithm, a certain stoppage criterion is used. An incoherent or anomalous identification is characterized by values of the parameters identified which disagree with the statistics of a series of identifications, called "baseline". The "baseline" is constructed using the results of all the $n_{ID}$ identifications of the elements $\alpha_j^{ID}$, wherein j=1,2, ... $n_{ID}$.

A preferred example of a stoppage criterion consists of the Mahalanobis squared distance, indicated with $D_j^2$ or also with MSD, which is a non-negative scalar quantity defined as:

$$D_j^2 = [\alpha_j^{ID} - \mu(\alpha_j^{ID})]^T [S]^{-1} [\alpha_j^{ID} - \mu(\alpha_j^{ID})]$$

wherein $\alpha_j^{ID}$ is the $n_p \times 1$ j-th "outlier" potential (incoherent value), $\mu(\alpha_j^{ID})$ is the $n_p \times 1$ vector average of the values identified, [S] is the covariance matrix of the baseline, having dimensions $n_p \times n_p$, and T represents the transposed value.

In general, the baseline and covariance matrix [S] can be constructed by taking into consideration all the identifications (inclusive mode) or only some of these (exclusive mode). In the method according to the present invention, as the "outlier" potentials are always unknown, both $\mu(\alpha_j^{ID})$, and the covariance matrix [S] are calculated inclusively, i.e. considering the statistics of all the identifications.

Operatively, for a certain identification problem of the obstructions in a certain pipeline network, once a series of identifications of the values of $\alpha_i$ have been effected, the Mahalanobis squared distance $D_j^2$ must be calculated for each identification and these values used for deciding whether or not an identification is plausible.

It is preferably convenient to discard those identifications characterized by a value of the Mahalanobis squared distance $D_j^2$ having a greater deviation, in absolute value, than the standard deviation with respect to the average of the Mahalanobis squared distances $D_j^2$.

Another possible stoppage criterion, which can be used in the case of a lack of pressure $h_i$ and/or flow-rate $Q_i$ measurements and/or to avoid an excess number of generations on the part of the genetic procedure, consists in fixing a priori a maximum number of generations of the variable vector $\alpha_i$.

FIG. 5 schematically shows a first embodiment of a pipeline network for transporting a mixture of methane-octane C1-NC8 to which the method for identifying obstructions according to the present invention has been applied, for illustrative purposes. This first illustrative network is composed of 7 pipeline sections PL1-PL9. A multiphase fluid-dynamic simulator was used for calculating the numerical flow-rate Q and pressure h values. The method according to the invention can in fact be integrated with a generic flow/process simulator capable of calculating the pressure h and flow-rate Q values in the network. The topological and geometrical data of the network, object of the simulation are collected in the following table:

| XPSIM pipe | junction i | $z_i$ (m) | junction j | $z_j$ (m) | L (m) | D (m) | e (μ) |
|---|---|---|---|---|---|---|---|
| PL1 | 1 | 2 | 10 | 1 | 15 | 13101 | 0.40 | 15 |
| PL2 | 2 | 3 | 0 | 2 | 10 | 65760 | 0.40 | 15 |
| PL4 | 3 | 5 | −25 | 3 | 0 | 21640 | 0.35 | 15 |
| PL8 | 4 | 6 | −35 | 5 | −25 | 27776 | 0.30 | 15 |
| PL6 | 5 | 7 | −60 | 6 | −35 | 15900 | 0.15 | 15 |
| PL7 | 6 | 8 | −60 | 6 | −35 | 6908.9 | 0.15 | 15 |
| PL9 | 7 | 9 | −70 | 5 | −25 | 26830 | 0.20 | 15 | wherein the value e(μ) represents the roughness of each pipeline section PL1-PL9.

In order to apply the method according to the invention, the boundary and constraint conditions must be defined, in terms of pressures and flow-rates, of the network. In particular, the flow-rate Q of the fluid mixture must be measured in the various inlet points of the network, indicated with FD-i, in addition to the pressure value h in correspondence with the tapping junction, indicated with PD-1. The constraints thus defined are collected in the following table:

| XPSIM ID | keyword | UoM | Value | VARY |
|---|---|---|---|---|
| PD1 | PRES | — | 17 | — |
| FD-9 | RATE | V | 40 | TFIX |
| FD-8 | RATE | W [kg] | 25400 | TFIX |
| FD-7 | RATE | W [kg] | 17500 | TFIX |

Three different methane-octane (C1-NC8) two-phase mixtures were considered at the inlets of the network (FD-i), with methane percentages of 10%, 15% and 20% of the flow-rate value Q established. These percentages subsequently vary in every point of the network in relation to the laws that govern the problem of transporting multiphase fluids. The specifications of the three different mixtures at the inlet of the network are indicated in the following table:

| MIXTURE | % C1 | % NC8 |
|---|---|---|
| M1 | 0.10 | 0.90 |
| M2 | 0.15 | 0.85 |
| M3 | 0.20 | 0.80 |

The pressure values ("Pres.") and flow-rate values ("Flow rate"), are then respectively calculated in correspondence with each junction and each pipeline section PL1-PL9, without obstructions, for the three different mixtures at the inlet of the network, as indicated in the following table:

| | XPSIM ID | | | | | |
|---|---|---|---|---|---|---|
| | M1 | | M2 | | M3 | |
| UoM | Pres. (bar) | Flow rate (kg/h) | Pres. (bar) | Flow rate (kg/h) | Pres. (bar) | Flow rate (kg/h) |
| FD-7 | 19.5636 | 17500 | 20.6669 | 17500 | 22.0490 | 17500 |
| S-14 | 18.2960 | 17500 | 18.7350 | 17500 | 19.5052 | 17500 |
| FD-8 | 19.3829 | 25400 | 20.4139 | 25400 | 21.7798 | 25400 |
| S16 | 18.2814 | 25400 | 18.7302 | 25400 | 19.4944 | 25400 |
| S17 | 18.2569 | 42900 | 18.7908 | 42900 | 19.4453 | 42900 |
| S18 | 17.9467 | 42900 | 18.1994 | 42900 | 18.6281 | 42900 |
| FD-9 | 19.0466 | 27845.39 | 19.8193 | 27669.88 | 20.9318 | 27478.69 |
| S20 | 17.9487 | 27845.39 | 18.1579 | 27669.88 | 18.6636 | 27478.69 |
| S23 | 17.9447 | 70745.39 | 18.2159 | 70569.88 | 18.6218 | 70378.69 |
| S26 | 17.5922 | 70745.39 | 17.6788 | 70569.88 | 17.8364 | 70378.69 |
| S27 | 17.5922 | 70745.39 | 17.6788 | 70569.88 | 17.8364 | 70378.69 |

-continued

| | XPSIM ID | | | | | |
|---|---|---|---|---|---|---|
| | M1 | | M2 | | M3 | |
| UoM | Pres. (bar) | Flow rate (kg/h) | Pres. (bar) | Flow rate (kg/h) | Pres. (bar) | Flow rate (kg/h) |
| S28 | 17.1406 | 70745.39 | 17.1654 | 70569.88 | 17.2557 | 70378.69 |
| PD-1 | 17.0479 | 70745.39 | 16.9832 | 70569.88 | 17.0059 | 70378.69 |

The multiphase equilibrium is calculated every 100 meters for each pipeline section PL1-PL9.

In order to effect the identification method according to the invention, the various cases of obstruction were analyzed and are described in the following table:

| SCENARIO | ID | L(m) | D(m) | $D^{EQ}$(m) | $\alpha^T$ | pipe |
|---|---|---|---|---|---|---|
| S1-M1-N0 | PL4 | 21640 | 0.35 | 0.2625 | 0.75 | 3 |
| S2-M1-N0 | PL9 | 26830 | 0.20 | 0.285 | 0.95 | 7 |
| S3-M1-N0 | PL4 | 21640 | 0.35 | 0.336 | 0.96 | 3 |
| | PL8 | 27776 | 0.30 | 0.279 | 0.93 | 4 |
| | PL7 | 6909 | 0.15 | 0.135 | 0.90 | 6 |
| S4-M1-N0 | PL1 | 13101 | 0.40 | 0.380 | 0.95 | 1 |
| | PL2 | 65760 | 0.40 | 0.360 | 0.90 | 2 |
| | PL4 | 21640 | 0.35 | 0.285 | 0.95 | 4 |
| S5-M2-N0 | PL4 | 21640 | 0.35 | 0.2625 | 0.90 | 3 |
| S2-M2-N2 | PL9 | 26830 | 0.20 | 0.285 | 0.95 | 7 |
| S3-M2-N2 | PL4 | 21640 | 0.35 | 0.336 | 0.96 | 3 |
| | PL8 | 27776 | 0.30 | 0.279 | 0.93 | 4 |
| | PL7 | 6909 | 0.15 | 0.135 | 0.90 | 6 |
| S2-M3-N2 | PL9 | 26830 | 0.20 | 0.285 | 0.95 | 7 | wherein, for each obstructed pipeline of the generic case $S_i$-$M_i$-$N_i$, the length (L) of the same pipeline, its nominal diameter (D), the equivalent diameter ($D^{EQ}$), the target value of the parameter $\alpha=\alpha^T$, in addition to the identification number of the pipeline ("pipe" column), are defined.

Each single case is characterized by an obstruction scenario ($S_i$), and by a specific methane-octane mixture ($M_i$) at the inlet of the network (FD-7, FD-8 and FD-9) and a precise noise level ($N_i$) set at the pressure values h and flow-rate values Q calculated. The specifications of the three noise levels ($N_i$) are indicated in the following table:

| NOISE | $nl_h$ | $nl_Q$ |
|---|---|---|
| N0 | 0.0 | 0.0 |
| N1 | 0.5 | 0.25 |
| N2 | 1.0 | 0.5 |

The results of the identifications obtained, upstream and downstream of the filtering effected by means of the Mahalanobis distance and considering the settings of the genetic algorithms defined in the following table:

| parameter | value |
|---|---|
| Population Size | 20 |
| Elite members | 2 |
| Crossover Fraction | 0.8 |
| Generations | 1000 |
| Fitness Limit | 1e-9 |
| Stall Generations Limit | 200 |
| Tolerance Function | 1e-9 | are represented in the diagrams of FIGS. 6-13 and are collected in numerical form in the tables of FIGS. 14 and 15. In each of FIGS. 6-13:

the diagram at the top of the page indicates, for each pipeline section PL1-PL9, the target value by means of the coefficient $\alpha^T$ (grey bar), the values of the 30 identifications $\alpha^{ID}$ (dots) and the average value of the 30 identifications $\mu(\alpha^{ID})$ (circle);

the diagram at the centre of the page shows the results of the "outlier" analysis. In particular, the dots indicate the Mahalanobis squared distance (MSD) of the j-th identification defined according to the calculation equation of $D_j^2$, the continuous line indicates the average MSD value of the 30 identifications, whereas the dashed lines delimit the distance of a standard deviation from the average MSD value. Finally, the circles indicate the identifications used for generating the diagram at the bottom of the page;

the diagram at the bottom of the page indicates, following the "outlier" analysis, the results of the identification procedure in a way graphically analogous to that indicated in the diagram at the top of the page.

FIG. 16 schematically shows a second embodiment of a pipeline network for transporting a mixture of methane-octane C1-NC8 to which the method for identifying obstructions according to the present invention has been applied, for illustrative purposes. This second illustrative network is composed of 15 pipeline sections PL1-PL15, it provides five immersed wells stationed along the coast, in the passage area of a riser cable, and a well further offshore for extractions in deep water. A pipeline exits from each well, which converges in a connection area, from which a main pipeline exits towards the tapping area of the fluid positioned on land. The geometrical and topological data of this network are collected in the following table:

| XPSIM | pipe | junction i | $z_i$ (m) | junction j | $z_j$ (m) | L (m) | D (m) | e (μ) |
|---|---|---|---|---|---|---|---|---|
| PL1 | 1 | 1 | 15 | 2 | 10 | 13101 | 0.40 | 15 |
| PL2 | 2 | 2 | 10 | 3 | 0 | 65760 | 0.40 | 15 |
| PL3 | 3 | 3 | 0 | 4 | 0 | 21905 | 0.35 | 15 |
| PL4 | 4 | 3 | 0 | 5 | -25 | 21640 | 0.35 | 15 |
| PL6 | 6 | 6 | -35 | 7 | -60 | 15900 | 0.15 | 15 |
| PL7 | 7 | 6 | -35 | 8 | -60 | 6909 | 0.15 | 15 |
| PL8 | 8 | 6 | -35 | 5 | -25 | 27776 | 0.30 | 15 |
| PL9 | 9 | 5 | -25 | 9 | -70 | 26830 | 0.20 | 15 |
| PL10 | 10 | 4 | 0 | 10 | -100 | 33509 | 0.35 | 15 |
| PL11 | 11 | 10 | -100 | 11 | -130 | 22167 | 0.35 | 15 |
| PL12 | 12 | 11 | -130 | 12 | -135 | 3562 | 0.30 | 15 |
| PL13 | 13 | 11 | -130 | 13 | -185 | 71688 | 0.20 | 15 |
| PL14 | 14 | 10 | -100 | 14 | -110 | 6662 | 0.30 | 15 |
| PL15 | 15 | 4 | 0 | 15 | -60 | 12934 | 0.25 | 15 | wherein the value e(μ) still represents the roughness of each pipeline section PL1-PL15.

The constraint conditions of the network, in particular the flow-rate Q of the fluid mixture in the various inlet points of the network, indicated with FD-i, and the pressure value h in correspondence with the tapping junction, indicated with PD-1, are collected in the following table:

| XPSIM ID | keyword | UoM | Value | VARY |
|---|---|---|---|---|
| PD-1 | PRES | — | 17 | — |
| FD-9 | RATE | V | 40 | TFIX |
| FD-8 | RATE | W [kg] | 25400 | TFIX |
| FD-7 | RATE | W [kg] | 17500 | TFIX |
| FD-15 | RATE | W [kg] | 30000 | TFIX |
| FD-14 | RATE | W [kg] | 68000 | TFIX |
| FD-12 | RATE | W [kg] | 40400 | TFIX |
| FD-13 | RATE | W [kg] | 48700 | TFIX |

For this network, the results of the identification procedure of obstructions relating to two cases are indicated hereunder. In particular, 30 identifications are effected for the same scenario of obstructions considering the mixture M1, on the basis of noise null ($N_0$) set at the pressure values h and flow-rate values Q calculated, and a further 30 identifications considering a certain noise level $N_1$:

| SCENARIO | ID | L(m) | D(m) | $D^{EQ}$(m) | $\alpha^T$ | pipe |
|---|---|---|---|---|---|---|
| S0-M1-N0 | PL10 | 33509 | 0.35 | 0.329 | 0.94 | 10 |
|  | PL11 | 22167 | 0.35 | 0.276 | 0.92 | 11 |
|  | PL12 | 3562 | 0.30 | 0.180 | 0.90 | 12 |
| S0-M1-N1 | PL10 | 33509 | 0.35 | 0.329 | 0.94 | 10 |
|  | PL11 | 22167 | 0.35 | 0.276 | 0.92 | 11 |
|  | PL12 | 3562 | 0.30 | 0.180 | 0.90 | 12 |

The results of the identifications, obtained considering a calculation step of 100 meters in each pipeline section PL1-PL15 of the network and the same settings of the genetic algorithms used for the network according to the previous example, are respectively collected in graphic form in FIGS. 17 and 18 and in numerical form in FIGS. 19 and 20.

The method according to the invention is therefore capable of identifying the presence of possible obstructions, single and multiple, considering different mixtures at the inlet of the network and different noise levels established at the flow-rate and pressure values measured. The obstructions can be identified in any type of network (branched, meshed or mixed networks).

The accuracy of the identifications is associated with the noise level set at these values. For null noise levels, the diameters of the pipelines, blocked and not blocked, are identified with a maximum error of 1.5% of the value of the diameters themselves and with a maximum dispersion of the identifications of 1.5%. In the case of null noise, the effects of the "outlier" analysis are negligible.

In some scenarios, the introduction of noise on the flow-rate and pressure values measured generates a certain dispersion in the identifications. This dispersion is governed by the variability of these values which are introduced into the fitness function. In any case, the identification of obstructions, again in terms of residual equivalent diameters, is also possible with noise levels up to 10% and/or with incomplete measurements. The dispersion evidently increases with a reduction in accuracy in the flow-rate and pressure measurements. This dispersion can therefore be used for controlling the quality of the measurements. Both the quality and the quantity of measurements in fact determine the quality of the results of the method, compatibly with constraints caused by economical reasons and the type and number of possible measurements.

The method described so far is applied to the combination of pipelines of a certain network. The fitness function is evaluated on the discrepancy between the pressure and flow-rate values obtained with the numerical model and the pressure and flow-rate values effectively measured, with each step (generation), where the theoretical values are calculated considering all the diameters of the network as variables. In other words, the genetic algorithms can vary all the values of the variables $\alpha_i$ in passing from one generation to the subsequent one. Once the convergence criterion of the genetic algorithms has been satisfied, all the values of $\alpha_p^{ID}$ can be found.

The method according to the invention can also operate as follows: instead of trying to find the convergence of the genetic algorithms in the way indicated above ("global" optimum), these genetic algorithms can be used for identifying the minimum of the fitness function with a variation in only one diameter at a time ("local" optimum). Once the minimum value of this fitness function has been reached, the value of that certain diameter is fixed and the subsequent diameter is considered until all the diameters of the network have been covered.

It can thus be seen that the method for identifying obstructions in pipeline networks for transporting fluids according to the present invention achieves the objectives previously specified.

The method for identifying obstructions in pipeline networks for transporting fluids of the present invention thus conceived can in any case undergo numerous modifications and variants, all included in the same inventive concept. The protection scope of the invention is therefore defined by the enclosed claims.

The invention claimed is:

1. A method for detecting and identifying restrictions and obstructions in one or more pipeline sections (P) of a pipeline network for transporting single-phase or multiphase fluid, wherein the pipeline network comprises a plurality of junctions (N), the method comprising:
acquiring geometrical data of a predefined number of pipeline sections (P) for which the presence of obstructions has to be evaluated, wherein the geometrical data comprises values of nominal lengths ($L_1$) and diameters ($D_1$) of the pipeline sections (P);
measuring an actual flow-rate value ($Q_1$) of the fluid in a pipeline section (P) and an actual pressure value ($h_i$) of the fluid at a junction (N) of the network;
comparing the values of the nominal diameters ($D_1$) of the pipeline sections (P) and corresponding equivalent diameters ($D_i^{eq}$) of the pipeline sections (P), wherein the value of each equivalent diameter ($D_i^{eq}$) is calculated as:

$$D_i^{eq} = \left[ L_i \left( \sum_j \frac{L_j}{D_j^5} \right)^{-1} \right]^{1/5}$$

calculating theoretical flow-rate values ($Q_i^T$) and pressure values ($h_i^T$) of the fluid for the equivalent diameters ($D_i^{eq}$) with a specified numerical model;
with $D_i^{eq} = \alpha_i \times D_i$, calculating a value of the variables vector $\alpha_i$, having a dimension equal to the predefined number of pipeline sections (P), which minimize a function based on a discrepancy between the actual flow-rate ($Q_i$) and pressure ($h_i$) values effectively measured and corresponding theoretical flow-rate ($Q_i^T$) and pressure ($h_i^T$) values, wherein the calculating of the value of the variables vector $\alpha_i$ is performed by applying a certain fitness function $J(\alpha)$ of a genetic algorithm; and
detecting and identifying restrictions and obstructions in the one or more pipeline sections ($P_1$) of the pipeline network based on the comparing the values of the nominal diameters ($D_1$) of the pipeline sections (P) and corresponding equivalent diameters ($D_i^{eq}$) of the pipeline sections (P) and the calculating of the theoretical flow-rate values ($Q_i^T$) and pressure values ($h_i^T$) of the fluid for the equivalent diameters ($D_i^{eq}$) with a specified numerical model.

2. The method according to claim 1, wherein the actual flow-rate ($Q_i$) and pressure ($h_i$) values are corrupted through an aleatory noise threshold, in order to simulate both the measurement uncertainty and non-perfect stationarity of the fluid flow inside the network.

3. The method according to claim 2, wherein flow-rate ($Q_{i,P}^{EXP}$) and pressure ($h_{i,N}^{EXP}$) values corrupted by the noise are calculated respectively as:

$$Q_{i,P}^{EXP} = Q_{i,P}(1 + nl_Q \times \beta_{i,P}^Q) \forall P$$

$$h_{i,N}^{EXP} = h_{i,N}(1 + nl_h \times \beta_{i,N}^h) \forall N$$

wherein $nl_Q$ and $nl_h$ are predefined noise levels for the flow-rate ($Q_i$) and pressure ($h_i$) data, respectively, $\beta_{i,P}^Q$ and $\beta_{i,N}^h$ are aleatory variables having a normal distribution with null average and standard unitary deviation, which vary for each pipeline section (P) and each junction (N) in the network, respectively.

4. The method according to claim 3, wherein the fitness function J(a) is obtained as follows:

$$J_1 = \left\{ \begin{array}{l} \log\left[\sum_{j=1}^{n_h}\left(\frac{h_j^{EXP} - h_j^c(\alpha)}{h_j^{EXP}}\right)^2\right] + \\ \log\left[\sum_{k=1}^{n_Q}\left(\frac{Q_k^{EXP} - Q_k^c(\alpha)}{Q_k^{EXP}}\right)^2\right] - \frac{\gamma}{n_p}\sum_{i=1}^{n_p}\alpha_i \end{array} \right\}$$

wherein $\gamma$ is a penalization parameter which reduces the number of false positive values caused by the presence of noise on the real flow-rate ($Q_i$) and pressure ($h_i$) values, $h_j^{EXP}$ and $Q_k^{EXP}$ are real values of pressure and flow-rate, respectively, and are corrupted by noise for a j-th junction (N) and k-th pipeline (P), $n_h$ is a total number of pressure measurements at the junctions (N) and $n_Q$ is a total number of flow-rate measurements in the pipeline sections (P).

5. The method according to claim 4, wherein $n_h < n_N$ and/or $n_Q < n_p$ are assumed in the absence of pressure ($h_i$) and/or flow rate ($Q_i$) measurements, wherein $n_p$ is a number of pipeline sections (P) and $n_N$ is a number of junctions (N) of the network.

6. The method according to claim 4, wherein the penalization parameter $\gamma$ is equal to 5.25.

7. The method according to claim 3, wherein the fitness function $J(\alpha)$ is obtained as follows:

$$J_2 = \sum_{j=1}^{n_h}\left(\frac{h_j^{EXP} - h_j^c(\alpha)}{h_j^{EXP}}\right)^2 + \sum_{k=1}^{n_Q}\left(\frac{Q_k^{EXP} - Q_k^c(\alpha)}{Q_k^{EXP}}\right)^2$$

wherein $h_j^{EXP}$ and $Q_k^{EXP}$ are actual pressure and flow-rate values, respectively, and are corrupted by noise for a j-th junction (N) and k-th pipeline (P), $n_h$ is a total number of pressure measurements at the junction (N), and $n_Q$ is a total number of flow-rate measurements in the pipeline sections (P).

8. The method according to claim 1, wherein the fitness function J($\alpha$) orders the vector variables $\alpha_i$ in relation to the quality of their solution J($\alpha_i$) and, should none of the values J($\alpha_i$) satisfy certain predefined convergence and/or tolerance criteria which are not in agreement with statistics of a series of identifications called baseline, a sub-algorithm typical of a genetic algorithm is selected from the group consisting of elitism, crossover and mutation, to generate a new variables vector $\alpha_i$, starting from that used in a current generation.

9. The method according to claim 8, wherein the generation of a new variables vector $\alpha_i$, the solution J($\alpha_i$) of which will be evaluated, is repeated until a particular set of equivalent diameters, defined as:

$$D_P^{ID} = \alpha_P^{ID} \times D_P \forall P$$

satisfies a certain stoppage criterion of the genetic algorithm.

10. The method according to claim 9, wherein the stoppage criterion comprises a square value of a Mahalanobis distance equal to a non-negative scalar quantity defined as:

$$D_j^2 = [\alpha_j^{ID} - \mu(\alpha_j^{ID})]^T [S]^{-1} [\alpha_j^{ID} - \mu(\alpha_j^{ID})]$$

wherein $\alpha_j^{ID}$ is a $n_p \times 1$ j-th potential incoherent value of the variables vector $\alpha_i$, $\mu(\alpha_j^{ID})$ is a $n_p \times 1$ vector average of the values identified, [S] is a covariance matrix of the baseline, having dimensions $n_p \times n_p$, and T represents a transposed value.

11. The method according to claim 10, wherein the square value of the Mahalanobis distance ($D_j^2$) is calculated for each generation of the variables vector $\alpha_i$.

12. The method according to claim 11, comprising a rejection phase of the variables $\alpha_i$ wherein a square value of the Mahalanobis distance ($D_j^2$) has a greater deviation, in absolute value, than the standard deviation with respect to the average square value of the Mahalanobis distances ($D_j^2$).

13. The method according to claim 8, wherein the generation of a new variables vector $\alpha_i$, the solution J($\alpha_i$) of which will be evaluated, is repeated until a predefined maximum number of generations of the variables vector $\alpha_i$ is reached.

14. The method according to claim 1, wherein the measurement of the actual flow-rate value ($Q_i$) of the fluid in a pipeline section (P) and the actual pressure value ($h_i$) of the fluid at a junction (N) of the network provides a minimum number of measurements defined through a sensitivity analysis procedure.

15. The method according to claim 1, which can be integrated with a generic flow/process simulator capable of calculating the pressure ($h_i$) and flow-rate ($Q_i$) values in the network.

16. The method according to claim 1, wherein the calculating theoretical flow-rate values ($Q_i^T$) and pressure values ($h_i^T$) of the fluid for the equivalent diameters ($D_i^{eq}$) is performed with a multiphase dynamic simulator.

* * * * *